United States Patent [19]

Menich et al.

[11] Patent Number: 4,704,734

[45] Date of Patent: Nov. 3, 1987

[54] METHOD AND APPARATUS FOR SIGNAL STRENGTH MEASUREMENT AND ANTENNA SELECTION IN CELLULAR RADIOTELEPHONE SYSTEMS

[75] Inventors: Barry J. Menich, Chicago; Frederick G. Atkinson, Winfield, both of Ill.

[73] Assignee: Motorola, Inc., Schaumburg, Ill.

[21] Appl. No.: 829,872

[22] Filed: Feb. 18, 1986

[51] Int. Cl.$^4$ ............................................. H04B 7/00
[52] U.S. Cl. ........................................ 455/33; 455/134; 455/277; 379/60
[58] Field of Search .................. 455/33, 134, 272, 275, 455/277; 379/59, 60

[56] References Cited

U.S. PATENT DOCUMENTS

| | | |
|---|---|---|
| 3,537,011 | 10/1970 | Escoula . |
| 3,663,762 | 5/1972 | Joel, Jr. . |
| 3,764,915 | 10/1973 | Cox et al. . |
| 3,860,872 | 1/1975 | Richardson et al. . |
| 3,898,390 | 8/1975 | Wells et al. . |
| 3,906,166 | 9/1975 | Cooper et al. . |
| 4,101,836 | 7/1978 | Craig et al. . |
| 4,128,740 | 12/1978 | Graziano . |
| 4,144,411 | 3/1979 | Frenkiel . |
| 4,144,496 | 3/1979 | Cunningham et al. . |
| 4,152,647 | 5/1979 | Gladden et al. . |
| 4,317,229 | 2/1982 | Craig et al. . |
| 4,369,520 | 1/1983 | Cerny . |
| 4,475,010 | 10/1984 | Huensch . |
| 4,481,670 | 11/1984 | Freeburg . |
| 4,485,486 | 11/1984 | Webb et al. . |
| 4,499,606 | 2/1985 | Rambo . |
| 4,513,412 | 4/1985 | Cox . |
| 4,549,311 | 10/1985 | McLaughlin . |
| 4,608,711 | 8/1986 | Goldman . |

FOREIGN PATENT DOCUMENTS 50841   3/1983   Japan .................................. 455/134

OTHER PUBLICATIONS

Motorola, Inc., "DYNA T*A*C* TM System Description" Instruction Manual No. 69P81150E01-0, 3/15/83, pp. 14-24.

N. Ehrlich et al., "Cell Site Hardware", Bell System Technical Journal, vol. 58, No. 1, Jan. 1979, pp. 153-199.

Primary Examiner—Jin F. Ng
Attorney, Agent, or Firm—Raymond A. Jenski; Rolland R. Hackbart; Donald B. Southard

[57] ABSTRACT

A method and apparatus for determining which sector antenna of a sectorized cellular radiotelephone system is receiving the strongest radio signal is disclosed. The signal strength of sector antennas is sequentially sampled, converted to digital representations, and stored according to which antenna received the signal. The digital representations are recalled from storage and the strongest signal along with an identification of the receiving antenna are determined. This determination may be used in the handoff process or in detecting when a remote unit requires a handoff.

10 Claims, 22 Drawing Figures

— PRIOR ART —

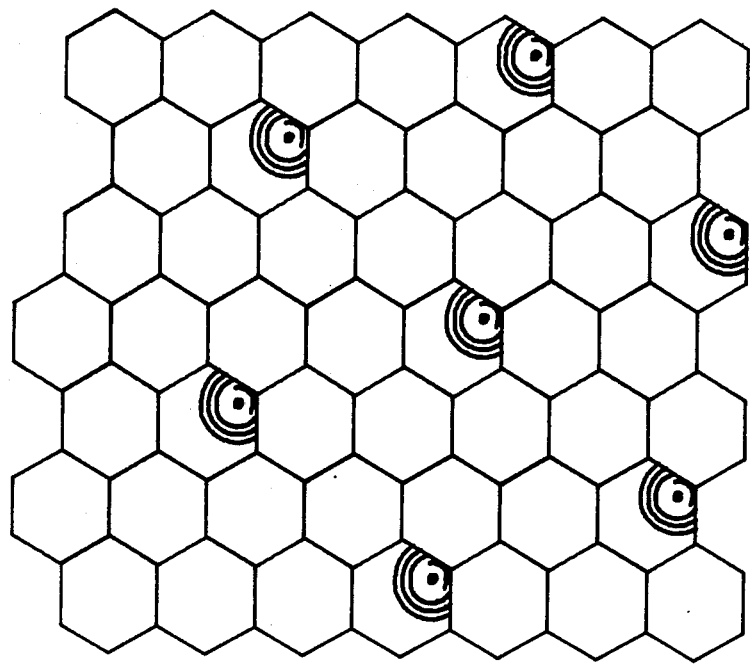
Fig. 2 — PRIOR ART —
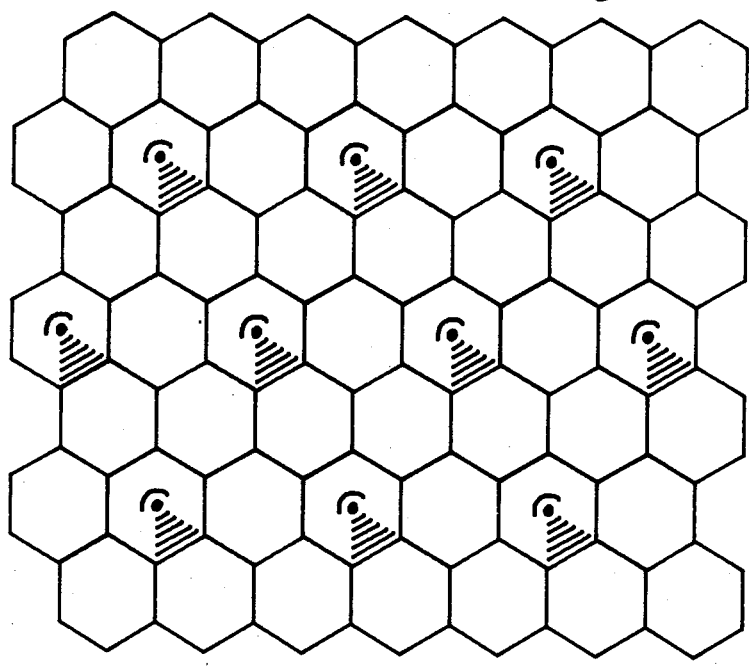
Fig. 3 — PRIOR ART —

— PRIOR ART —

Fig. 5 —PRIOR ART—

— PRIOR ART —

METHOD AND APPARATUS FOR SIGNAL STRENGTH MEASUREMENT AND ANTENNA SELECTION IN CELLULAR RADIOTELEPHONE SYSTEMS

BACKGROUND OF THE INVENTION

Reference is made to three copending applications (U.S. patent application Ser. No. 830,166, "Scanning Receiver Allocation Method and Apparatus for Cellular Radiotelephone Systems", by Menich et al. Ser. No. 830,145, "Improved Cellular Radiotelephone Land Station", by Atkinson et al.; and Ser. No. 830,390, "Interface Method and Apparatus for a Cellular System Site Controller", by Menich et al.) filed on the same date Feb. 18, 1986 as the present application and containing related subject matter.

The present invention generally relates to the fixed equipment of radiotelephone communication systems and more specifically relates to a method and apparatus for determining which antenna of a sectorized cellular radiotelephone system receives the strongest radio signal.

Mobile radiotelephone service has been in use for some time and traditionally has been characterized by a central site transmitting with high power to a limited number of mobile or portable units in a large geographic area. Mobile or portable transmissions, due to their lower transmission power, were generally received in previous systems by a network of receivers remotely located from the central site and the received transmission was subsequently returned to the central site for processing. In previous systems only a limited number of radio channels were available, thus limiting the number of radiotelephone conversations in an entire city to the limited number of channels available.

Modern cellular radiotelephone systems have a comparatively large number of radio channels available which, further, can be effectively multiplied by reuse of the channels in a metropolitan area by dividing the radio coverage area into smaller coverage areas (cells) using low power transmitters and coverage restricted receivers. Such cellular systems are further described in U.S. Pat. Nos. 3,906,166—Cooper et al.; 4,485,486—Webb et al.; and 4,549,311—McLaughlin, each assigned to the assignee of the present invention. The limited coverage area enables the channel frequencies used in one cell to be reused in another cell geographically separated according to a predetermined plan, such as a seven cell repeating omnidirectionally illuminated cell pattern shown in FIG. 1. In this pattern radio frequency energy is omnidirectionally transmitted from and received by a plurality of centrally located fixed stations and reuse of frequencies is accomplished in a pattern of cells such as that shown shaded in FIG. 1.

An alternative cellular pattern, FIG. 2, depicts a corner illuminated cell system in which 120° antennas are employed to illuminate the interior of a cell from three of the vertices of a hexagonal cell. (Although cell systems are conventionally shown as regular hexagonal patterns, such regularity is rarely achieved in practice).

Another pattern, FIG. 3, depicts a center illuminated cell system in which the cells are further subdivided into sectors. The sectors are illuminated by 60° antennas as illustrated in FIG. 3. A center illuminated sector cell system is further described in U.S. Pat. No. 4,128,740—Graziano and assigned to the assignee of the present invention. Thus, a large number of channels can be made available in a metropolitan area and the service provided thereby can appear to be identical to a standard wire line telephone.

A cell system typically utilizes one duplex frequency pair channel in each cell (a signalling channel) to receive requests for service from mobiles and portables, to call selected mobiles or portables and to instruct the mobiles or portables, to tune to another channel where a conversation may take place. This signalling channel is continuously assigned the task of receiving and transmitting data to control the actions of the mobile and portable radios. If the cell is sectorized as shown in FIG. 3, specialized receivers have been developed to enable the inputs from six 60° antennas to be combined for instantaneous reception over the sectorized cell coverage area. One such specialized receiver is described in U.S. Pat. No. 4,369,520—Cerny, Jr., et al., assigned to the assignee of the present invention.

Since the cells may be of relatively small size, the likelihood of a mobile or portable travelling between sectors or out of one cell and into another cell is high. The process of switching the established call from one sector or from one cell to another is known as handoff. Handoff previously has required specialized receiving equipment such as a "scanning" receiver which can be instructed to tune to any of the channels in use in any of the sectors of the cell to measure the signal strength of each active mobile or portable. If the measured signal strength is below a predetermined level, cellular control equipment determines the availability of other channels in other sectors of the same cell or in neighboring cells and composes an instruction to the mobile or portable commanding it to tune to the new channel.

In order to determine which sector of a sectorized cell is receiving the best signal of the six sectors, traditional fixed site equipment included a plurality of specialized receivers which could be commanded to monitor one or more sectors at a particular frequency to determine whether a particular served remote unit signal was becoming too weak or whether a remote unit from another cell or another sector could be handed off to the particular sector being monitored. This traditional design required the specialized "scanning" receivers at additional cost and complexity.

SUMMARY OF THE INVENTION

Therefore, one object of the present invention is to reduce the cost and complexity of the fixed site equipment of a cellular radiotelephone system by reducing or eliminating specialized receiving equipment such as scanning receivers.

It is a further object of the present invention to utilize common receiving equipment to measure the received signal strength of a served remote unit while providing a receiver for voice channel conversation.

It is a further object to provide voice channel receivers with signal strength measurement capability such that adjacent sector antennas can be monitored for received signal strength or that six sectors of a sectorized cell can be monitored for received signal strength.

Accordingly, these and other objects may be achieved with the present invention. Briefly, the present invention is the method and apparatus for determining which of three sector antenna receives the best signal strength from a served remote unit. This is realized by rectifying and digitizing an RF signal received in a primary sector antenna and storing the digital representation in a plurality of storage locations. Adjacent left and right sector antennas are sequentially sampled for the RF energy at the frequency being used by the served remote unit. The RF energy sample is then rectified and digitized into sequential digital representations. The sequential digital representations are cyclically stored in first and second storage locations which are associated with the adjacent sector antennas. Each storage location is then sampled and the RF signal with the greatest magnitude is determined along with the antenna on which that RF signal was received.

BRIEF DESCRIPTION OF THE DRAWINGS

FIG. 2 is a representation of the geographic area covered by a conventional corner illuminated cell system.

FIG. 3 is a representation of the geographic area covered by a conventional center illuminated sector cell system.

DETAILED DESCRIPTION OF THE PREFERRED EMBODIMENT

Figure 1:
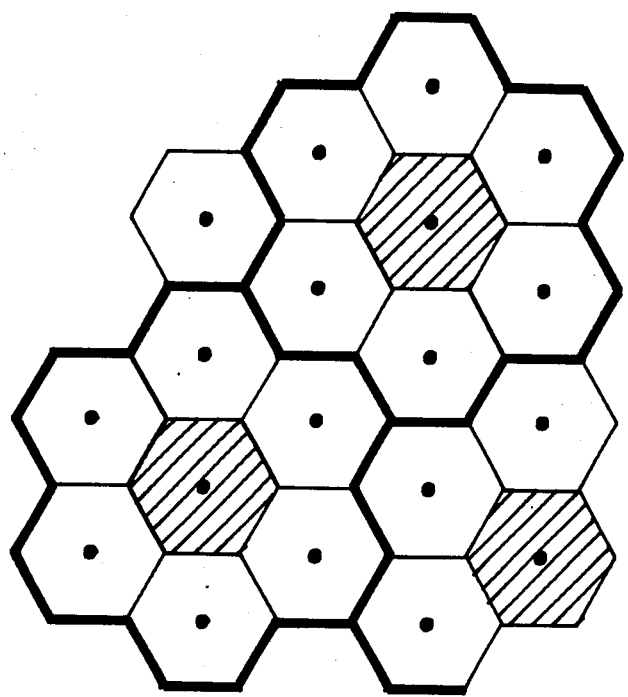
FIG. 1 is a representation of the geographic area covered by a conventional omnidirectionally illuminated cell system.
Figure 4:
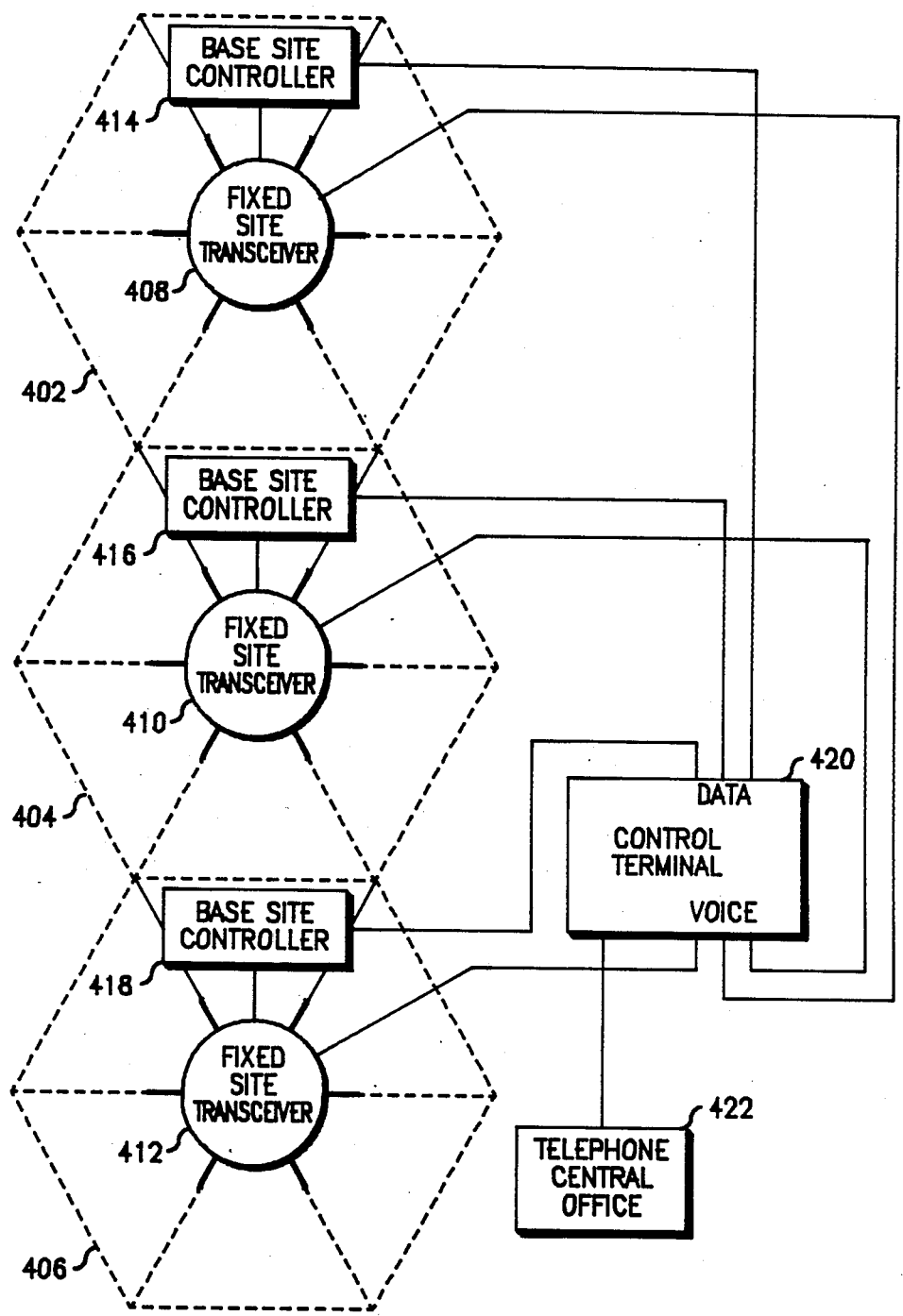
FIG. 4 is a basic block diagram of the relationships of the equipment which would be employed in a conventional center illuminated sector cell system.

Referring now to FIG. 4, there is illustrated a cellular radiotelephone communications system of the type which may particularly benefit from the invention herein described. The illustration of FIG. 4 shows three center illuminated sector cells of the type previously described in conjunction with FIG. 3 but with more detail regarding the type of equipment to be found in a sector cell system. Although the present invention will be described with particularity for the center illuminated sector cell system, it is obvious that a person skilled in the art may be able to apply the essence of the present invention to other types of cellular configurations such as those shown in FIG. 2 and FIG. 1.

As illustrated in FIG. 4, the geographical area is subdivided into cells 402, 404, and 406 which are illuminated with radio frequency energy from fixed site transceivers 408, 410, and 412, respectively. The fixed site transceivers are conventionally controlled by base site controllers 414, 416, and 418 as illustrated. These base site controllers are each coupled by data and voice links to a radiotelephone control terminal 420 which may be similar to the terminals described in U.S. Pat. Nos. 3,663,762; 3,764,915; 3,819,872; 3,906,166; and 4,268,722. These data and voice links may be provided by dedicated wire lines, pulse code modulated carrier lines, microwave radio channels, or other suitable communication links. Control terminal 420 is, in turn, coupled to the switched telephone network via a conventional telephone central office 422 for completing telephone calls between mobile and portable radiotelephones and landline telephones.

Figure 5:
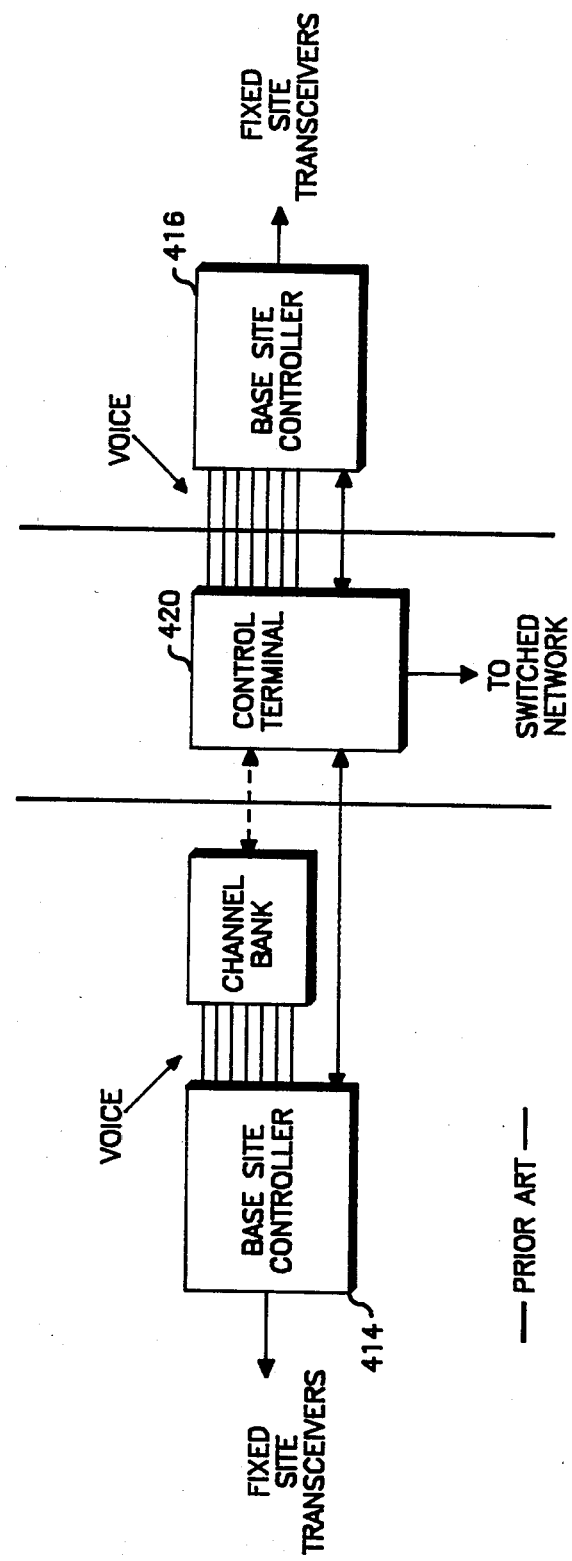
FIG. 5 is a block diagram of the interconnection between a control terminal and the base site controllers of a conventional cell system.

The interconnection between control terminal 420 and the base site controllers (BSCs) is further shown in FIG. 5. The per-channel interconnection may be on a line per channel basis such as shown between control terminal 420 and BSC 416 or the interconnection may be on a PCM group basis such as shown between control terminal 420 and BSC 414. Either type of interconnection is well known in the art. A separate data line (which may be a standard telephone line or other communications link capable of carrying 4800 baud data) is extended between the control terminal 420 and each BSC under its control.

Each of the fixed site transceivers 408, 410, and 412 includes a plurality of transmitters and receivers for operating on at least one duplex signalling channel and a plurality of duplex voice channels. One conventional system employs transmitters and receivers of the type described in Motorola Instruction Manual No.68P810-60E30, published by Motorola Service Publications, Schaumburg, Ill., in 1982. Employing this equipment and spacing the channels in use at least 630 KHz from each other, enables the individual transmitters to be combined on a single antenna (which may be a 60° directional antenna) as illustrated in FIG. 6.

Figure 6:
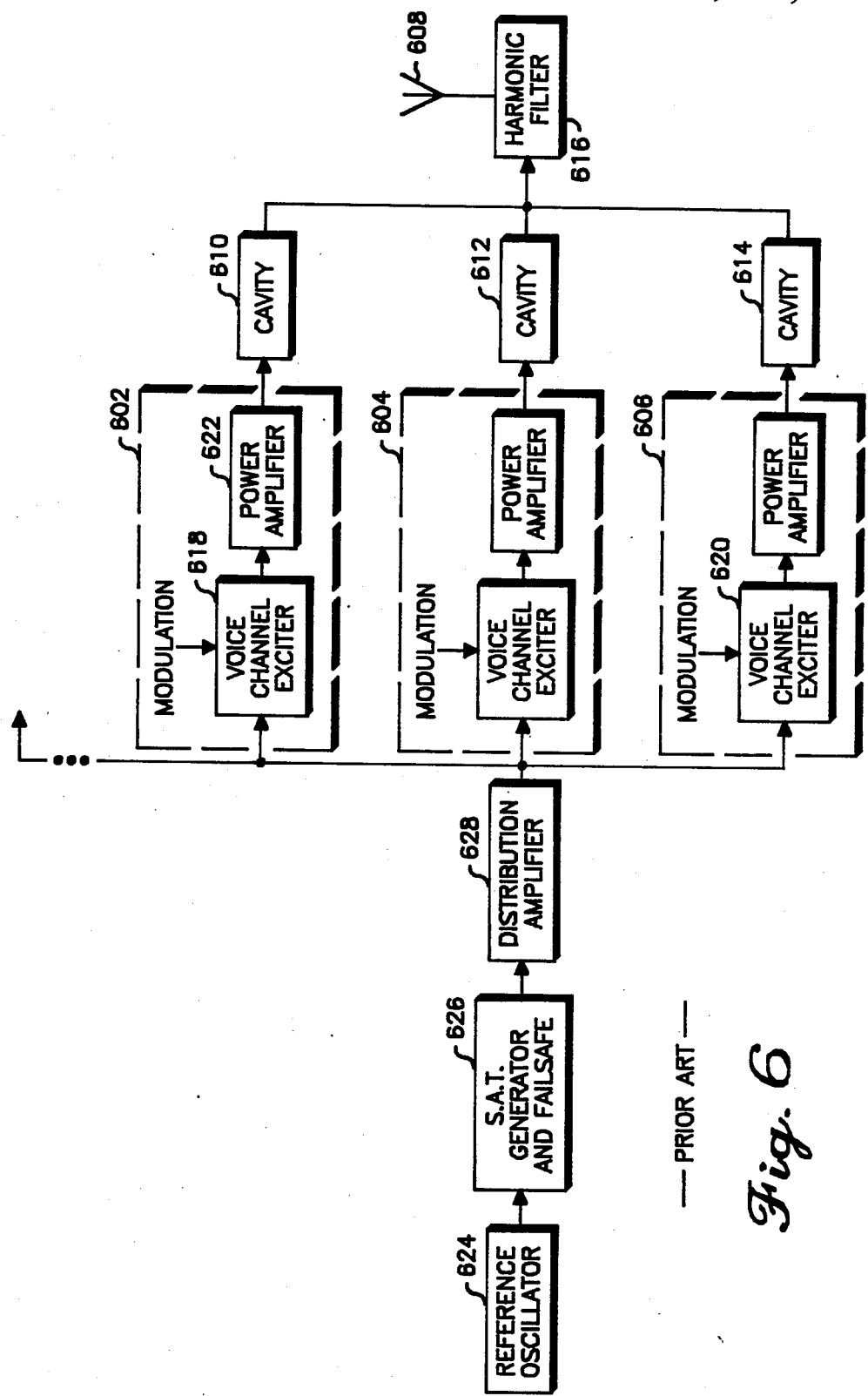
FIG. 6 is a block diagram of a conventional fixed site multi channel transmitter for a cell system.

In FIG. 6, three transmitters 602, 604, and 606 are shown connected to an antenna 608 via combining cavities 610, 612, and 614 and harmonic filter 616. Each transmitter consists of a voice channel exciter 618 for voice channels or a signalling channel exciter 620 for a signalling channel and a power amplifier 622. Each of the conventional transmitters shares a common reference oscillator 624, a supervisory audio tone (SAT) generator and failsafe circuit 626, and a distribution amplifier 628.

Figure 7:
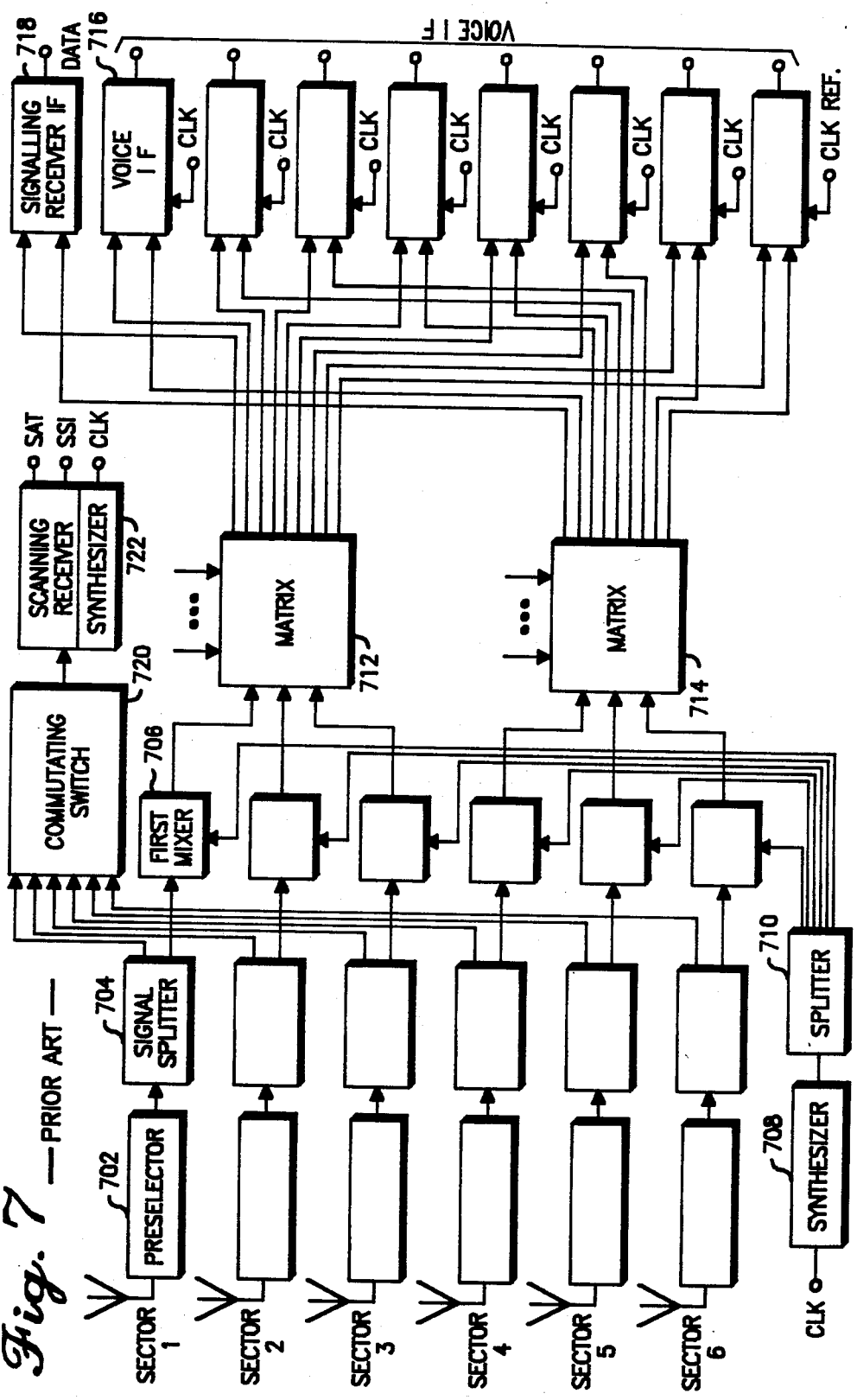
FIG. 7 is a block diagram of a conventional fixed site receiver system which may be employed in an omnidirectionally illuminated cell system.
Figure 8:
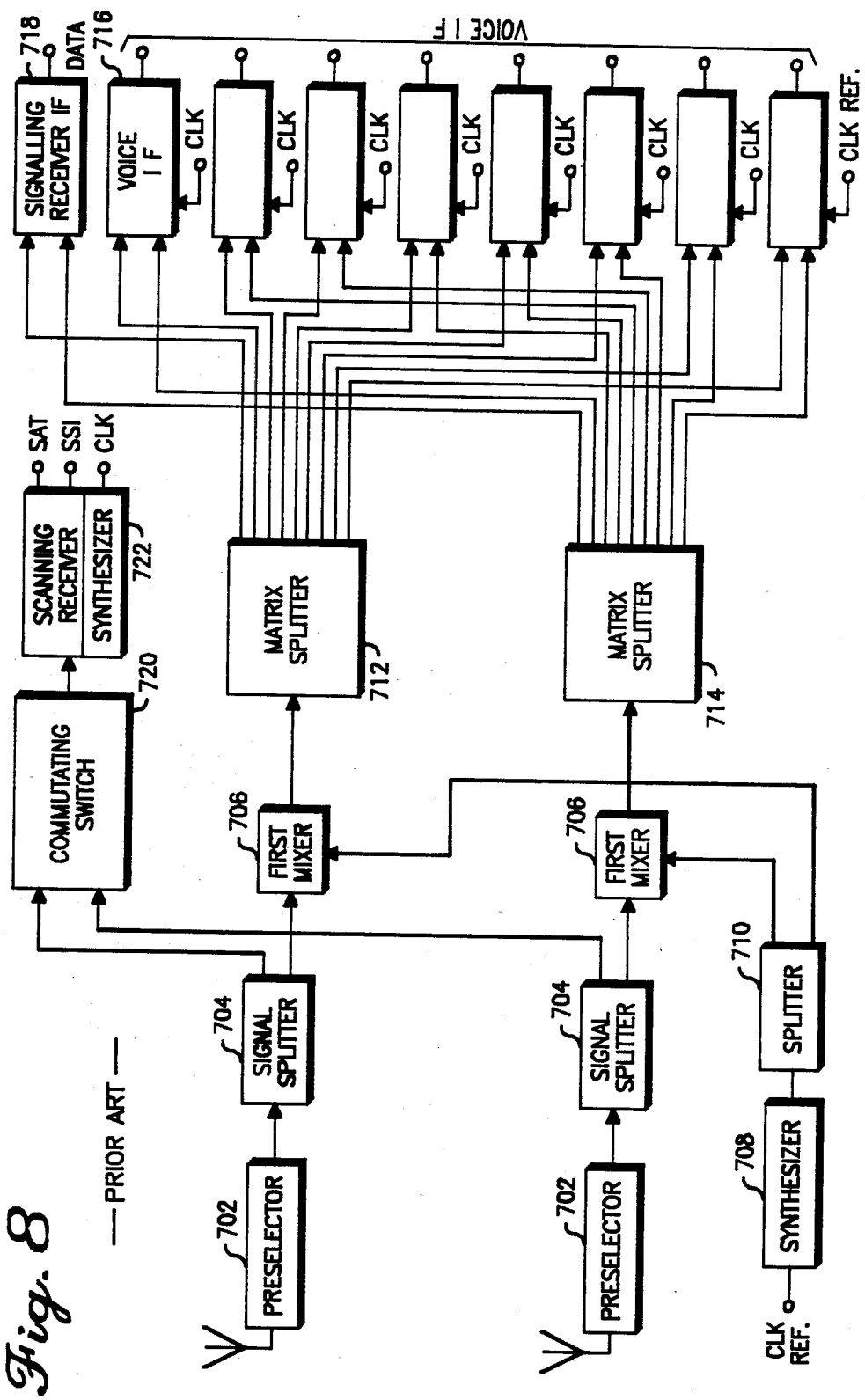
FIG. 8 is a block diagram of a conventional fixed site receiver system which may be employed in a center illuminated sector cell system.

The conventional receiving system is designed in modular groups of eight voice channel receivers, a signalling receiver, and a scanning receiver. Two possible system configurations are shown in FIGS. 7 and 8. Considering first the six sector receive system shown in FIG. 7, it can be seen that a set of broadband preselectors 702, signal splitters 704, and first mixers 706 convert each sector antenna input to an intermediate frequency (IF) for use by the remainder of the receivers. Local oscillator input to first mixers 706 is provided by a common synthesizer 708 and distributed to each of the first mixers 706 by splitter 710. Two switch matrices, matrix 712 and matrix 714 connect a pair of antennas corresponding to adjacent sectors to each of the voice receiver IFs 716 and the signalling receiver IF 718. A commutating RF switch 720 is connected to each of the signal splitters 704 and steps the scanning receiver 722 through each of the six sector antennas.

An omnidirectional receive system is shown in FIG. 8 and is a conventional subset of the sector receive system of FIG. 7. Two omnidirectional antennas encompass the entire 360° coverage area within the cell. The down converted signal from each of the antennas and output from first mixers 706 are split among each of the voice IF receivers 716 and the signalling receiver 718 by matrix splitters 812 and 814. Further, the scanning receiver 722 is toggled between the two antennas by commutating switch 820.

Figure 9:
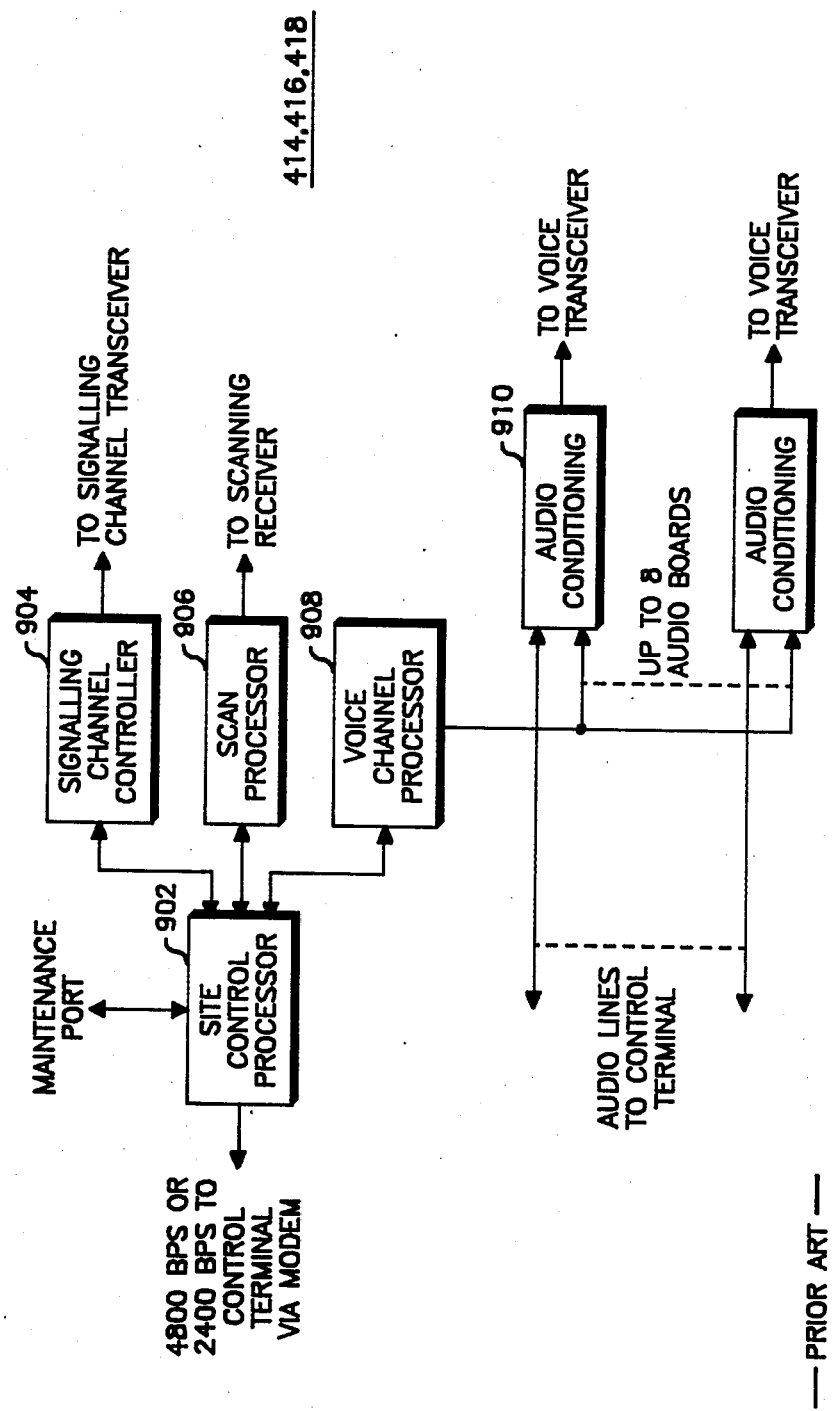
FIG. 9 is a block diagram of a conventional base site controller which may be employed in a cell system.

The conventional base site controller (414, 416, or 418) is shown in more detail in the block diagram of FIG. 9. The base site controller (BSC) provides two-way subscriber remote unit (mobile and portable) signalling, voice communications, and complete control and performance monitoring of the fixed site equipment. The BSC consists of a site control processor module 902 which controls all aspects of the base site operation. The site control processor 902 contains memory storage buffers for communication with the peripheral processors 904, 906 and 908. The site control processor 902 also contains serial interface ports for communicating with other site control processors and for communicating with the control terminal 420 and an RS-232 port for connection to a maintenance terminal. A signalling channel controller peripheral 904 sends paging and overhead messages to subscriber units via the signalling channel by command of the site control processor 902. The signalling channel controller 904 also decodes and corrects data received from subscriber units. In systems using sector receive antennas, it uses information from the signalling channel receiver 718 to make an initial estimate of the subscriber unit's location.

The scan processor peripheral 906 measures every active subscriber unit signal strength on each receive antenna. Method and apparatus for measuring signal strength on receive antennas is further described in U.S. Pat. No. 4,485,486—Webb et al., assigned to the assignee of the present invention. It also measures the supervisory audio tone frequency of subscriber units to verify that it is making measurements on the correct subscriber unit. The scan processor 906 is capable of directing the scanning receiver 722 to any subscriber frequency and measuring any of the three supervisory audio tone frequencies. The voice channel processor peripheral 908 controls up to eight voice channel IFs and the subscriber units using them. The voice channel processor 908 interfaces to each voice channel receiver through an audio conditioning board 910. The voice channel processor 908 sends messages to subscriber units by command of the site control processor 902 and further decodes and corrects data messages from subscriber units over the appropriate voice channel. The voice control processor 908 controls voice transmitters and voice channel receive antenna selection. The audio conditioning boards 910 are employed one for each voice channel in use at a fixed site. The audio conditioning boards 910 conditions and controls the audio for connection to both the receiver and transmitter radio equipment and the telephone lines to the control terminal 420.

Figure 10:
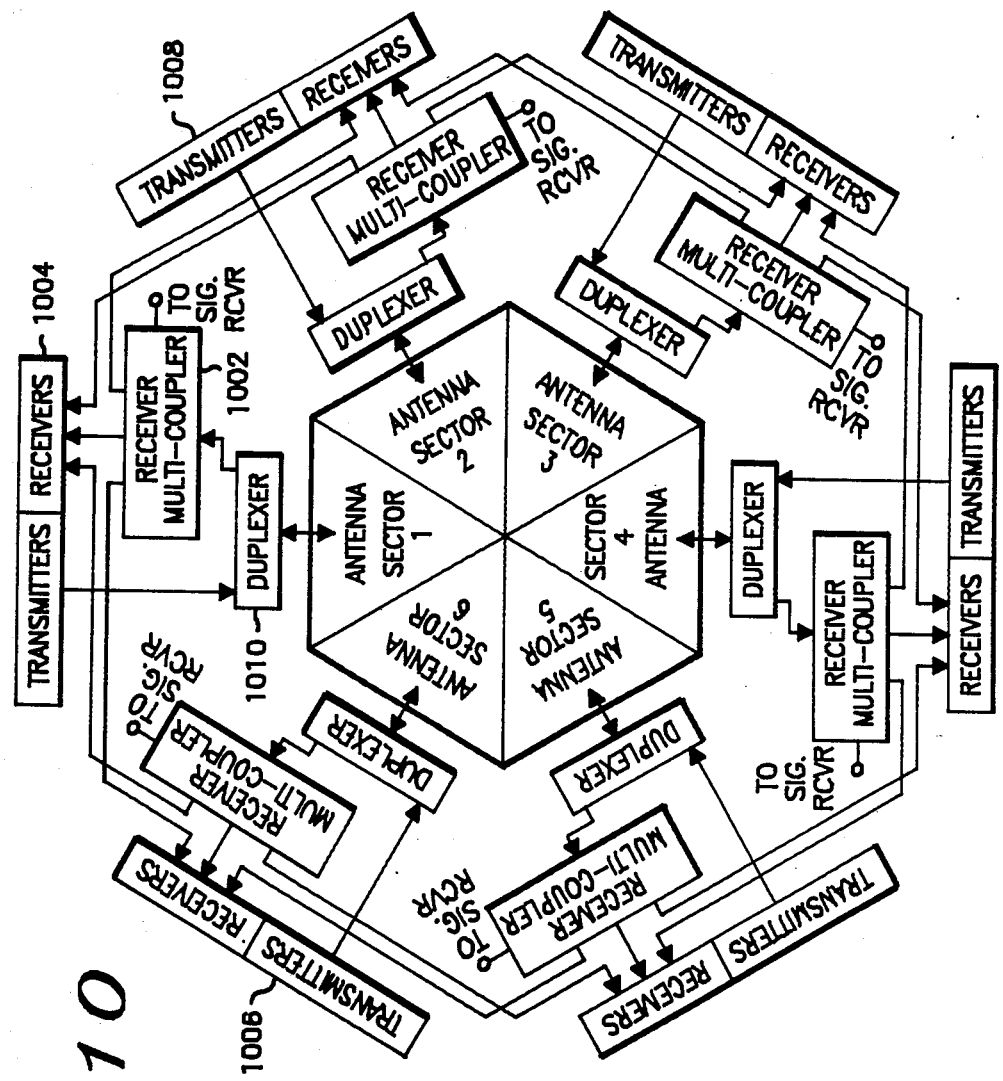
FIG. 10 is a block diagram of antenna interconnection in a center illuminated sector cell system which may advantageously utilize the present invention.

In order to reduce the amount of common equipment, provide for ease of expansion, and reduce the amount of intercabling and interconnection, the preferred embodiment of the novel invention of the present application may utilize the antenna system configuration shown in FIG. 10. The radio transceivers are connected to the sector antennas as shown. Especially note that each sector antenna is fed by a multicoupler (for example, RX multicoupler 1002) to the primary transceiver equipment dedicated to the particular sector (for example, transceivers 1004) and to both the adjacent sector transceiver equipment (for example, transceivers 1006 for sector 6 and transceivers 1008 for sectors 2). In addition, each sector antenna is coupled to a signalling receiver allowing the signalling receiver to have access to all six sector antennas. The transmitters of the primary transceiver equipment is coupled to the sector antenna via a duplexer (such as duplexer 1010). The duplexers may be similar to model ACD-2802-AAMO manufactured by Antenna Specialists Co., Cleveland, Ohio.

Figure 11:
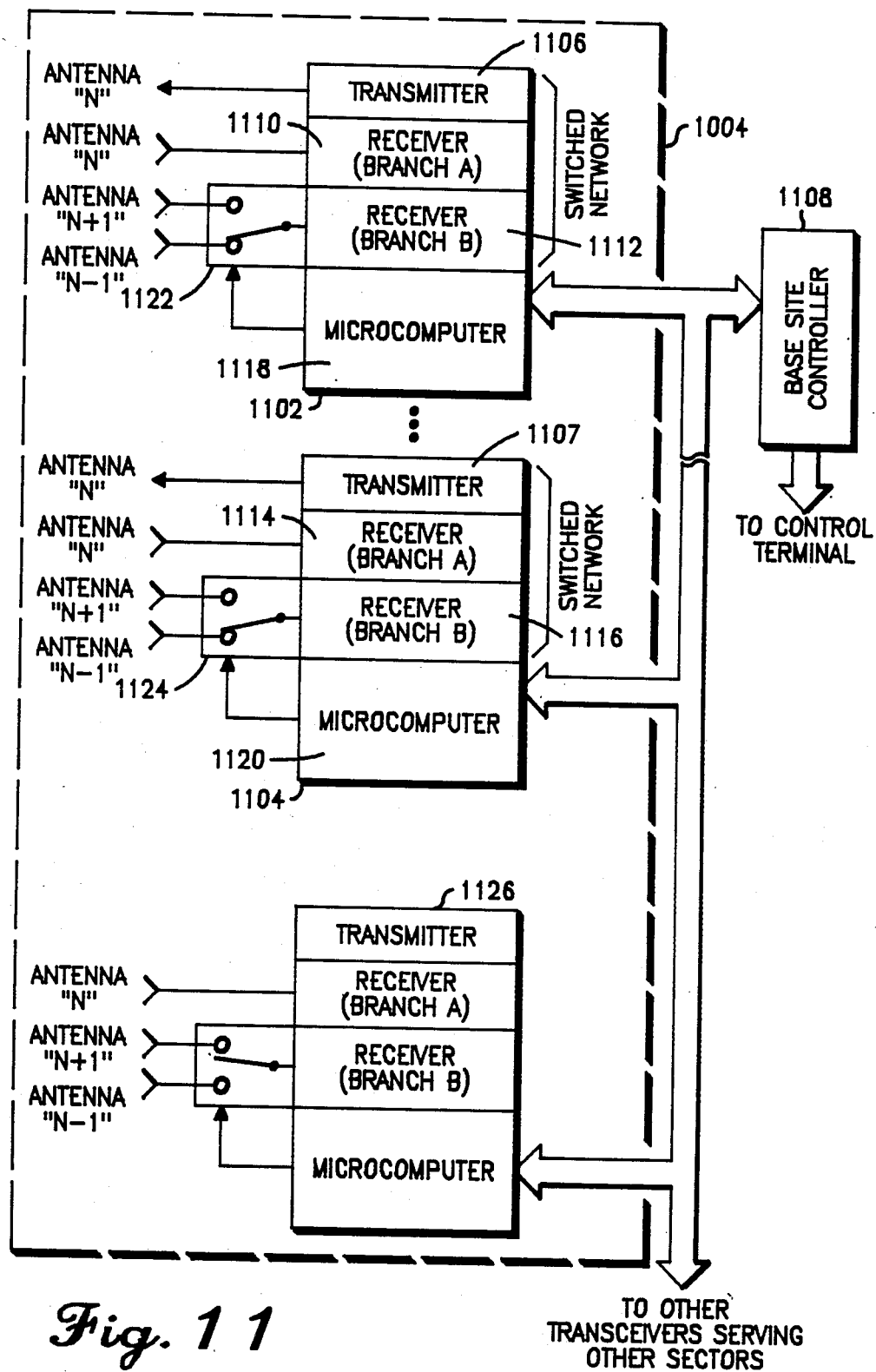
FIG. 11 is a block diagram of transceiver and base site controller interconnection in a cell system which may benefit from the present invention.

The interconnection of the fixed site transceivers to the antenna system and to the base site controller is shown in FIG. 11. In this configuration a transceiver (such as transceiver 1102 or transceiver 1104) consists of a transmitter 1106 and 1107 respectively, diversity receivers 1110 and 1112 (for transceiver 1102) and diversity receivers 1114 and 1116 for transceiver 1104. Each transceiver also comprises a microcomputer (1118 and 1120, respectively) and a sector switch (1122 and 1124, respectively). Additionally, an identical transceiver may be used as a scan receiver by employing the diversity receivers and the microcomputer as shown for transceiver 1126. (The transmitter for transceiver 1126 is not used).

Concentrating on the interconnections of transceiver 1102, it can be seen that transmitter 1106 and receiver (branch A) 1110 are coupled to the same primary antenna (via the duplexer 1010 and receiver multicoupler 1002 to antenna 1 as shown in FIG. 10). Receiver (branch B) 1112 is coupled to left and right adjacent sectors via sector switch 1122 (which from FIG. 10 are antenna 6 and antenna 2). The output bus from the BSC 1108 is connected to each of the microcomputers of the transceivers at a cell site. In the transceivers of the present invention, the transmitter 1106 input and receivers 1110 and 1112 output are connected to the switched network via the control terminal 420. Control of the interconnection to the control terminal 420 is achieved by microcomputer 1118 via control signals from the BSC 1108.

Figure 12:
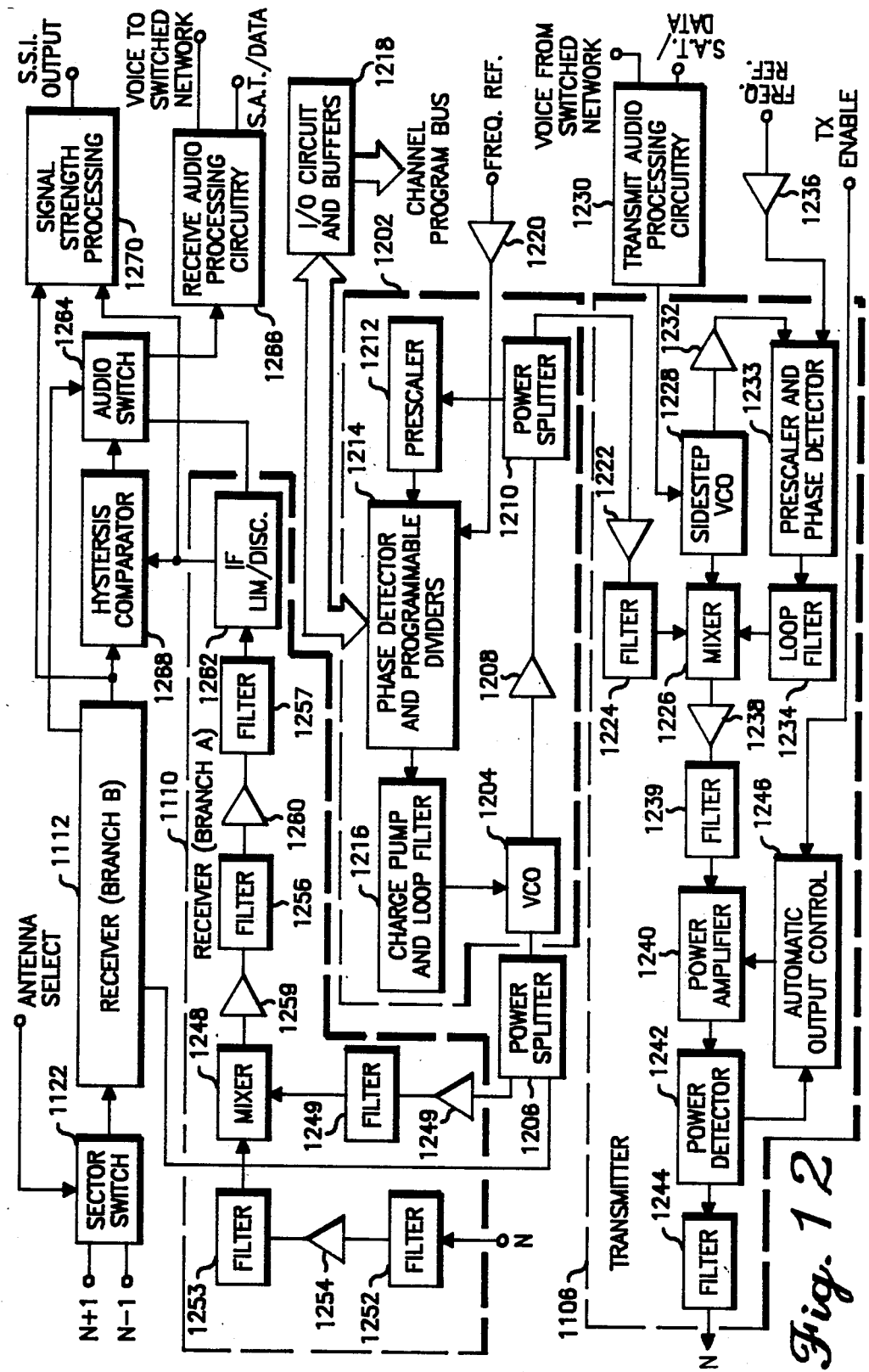
FIG. 12 is a detailed block diagram of the transceiver which may be employed in the system of the present invention.

A more detailed block diagram of the transceivers of the preferred embodiment is shown in FIG. 12. Transmitter 1106 and receivers 1110 and 1112 from transceiver 1102 are shown in detail. Each of the other transceivers including the scanning transceiver 1126 may have an identical design. In a preferred implementation of the present invention, a synthesizer 1202 having a conventional VCO 1204 provides the local oscillator signal for both receivers 1110 and 1112 via a power splitter 1206. The VCO 1204 also supplies a radio frequency signal to the transmitter 1106 via a buffer amplifier 1208 and power splitter 1210. A second output from power splitter 1210 is used as part of the conventional feedback of a frequency synthesizer and routed through pre-scaler 1212 to the phase detector and programmable dividers 1214 which, in turn, provides a correction signal to the charge pump and loop filter 1216 to place and hold the VCO 1214 at the proper frequency. Frequency selection is conventionally made by selecting the proper division ratio of the programmable dividers 1214 via the channel program bus and I/O circuit and buffers 1218. The channel program bus is coupled to the transceiver microcomputer (such as microcomputer 1118) which selects the proper digital signal for the bus to place the transceiver on a designated channel. The ultimate stability of the synthesizer 1202 is determined by the frequency reference generated by an input to the phase detector and programmable dividers 1214 via buffer 1220. This reference is generated by a reference oscillator located in the common rack front end cabinet. The transmitter 1106 accepts the synthesizer 1202 frequency output signal at buffer amplifier 1222 and filters the radio frequency signal by filter 1224 before applying the radio frequency signal to mixer 1226. A second signal applied to mixer 1226 is generated by the sidestep VCO 1228 and conventionally angle modulated by voice signals from the switched network and data and supervisory audio tone (SAT) which are input to the sidestep VCO 1228 via transmit audio processing circuitry 1230 (which may be similar to model TRN9732A, Audio/Control Board described in Motorola Instruction Manual No. 68P81071E17, published by Motorola Service Publications, Schaumburg, Ill., in 1985). The sidestep VCO 1228 is maintained at a frequency which is equal to or related to the spacing between the receiver and transmitter operating frequencies of the selected channel and the frequency chosen as the intermediate frequency of the receivers 1110 and 1112 by the conventional synthesizer control loop consisting of buffer amplifier 1232, prescaler and phase detector 1233, and loop filter 1234. Ultimate loop stability is controlled by the same frequency reference used for synthesizer 1202 via buffer amplifier 1236. (A similar method of sidestepping frequencies for duplex receivers and transmitters is further described in U.S. Pat. No. 3,825,830—O'Connor assigned to the assignee of the present invention). The output signal from mixer 1226, which in the present invention is equal to the output frequency of the transmitter on this selected channel is coupled via amplifier 1238 and filter 1239 to power amplifier 1240 where the transmitter signal is boosted in power to a useable transmission level. The output of the power amplifier 1240 is coupled through a power detector 1242 and a filter 1244 before being coupled to a duplexer (such as duplexer 1010) or to an external power amplifier which may further increase the transmitter signal power. The output from power detector 1242 is coupled to a conventional automatic output control circuit 1246 which fixes the level of the output of power amplifier 1240 at a constant level.

The receiver local oscillator signal is coupled from the power splitter 1206 to the mixer 1248 of receiver (branch A) 1110 via buffer amplifier 1249 and filter 1250. (Identical circuit configuration exists for receiver (branch B) 1112 and an identical description for receiver (branch B) 1112 is omitted here for brevity). A received signal from the primary antenna is input to the mixer 1248 via filters 1252 and 1253 and radio frequency preamp 1254. The intermediate frequency (IF) product of the two signals input to mixer 1248 is selected by filters 1256 and 1257 and amplified by IF amplifiers 1259 and 1260 before being applied to an IF limiter/discriminator circuit 1262. Two outputs are provided from the IF limiter/discriminator 1262, the first of which is the demodulated audio signal which is passed through audio switch 1264 and receive audio processing circuitry 1266 (which may also be similar to a model TRN9732A Audio/Control Board) where the voice signal is coupled to the switched network, the data is coupled to the BSC, and the supervisory audio tone (SAT) is detected by comparison to a locally generated tone and the detection is supplied to a microprocessor of the transceiver microcomputer 1118. A second output from the IF limiter discriminator 1262 is a signal which corresponds to the signal strength of the received signal from the antenna and is known as the receive signal strength indicator (RSSI). The RSSI signal is coupled to a hysteresis comparator 1268 (an MC3302 or equivalent in the preferred embodiment) which compares the RSSI signal from receiver (branch A) 1110 and receiver (branch B) 1112. The result of the comparison causes the audio switch 1264 to pick the demodulated audio signal from either receiver 1110 or receiver 1112 depending upon which RSSI signal indicates a stronger received signal and allows that demodulated audio to be coupled to the received audio processing circuitry 1266. In one implementation of the preferred embodiment, further processing of the RSSI signal is accomplished in a signal strength processing circuit 1270 and output to the transceiver microcomputer 1118 for use by the BSC 1108 and control terminal 420. Such a receiver having the signal strength processing circuit 1270 may be used as a scanning receiver 1126.

Figure 13:
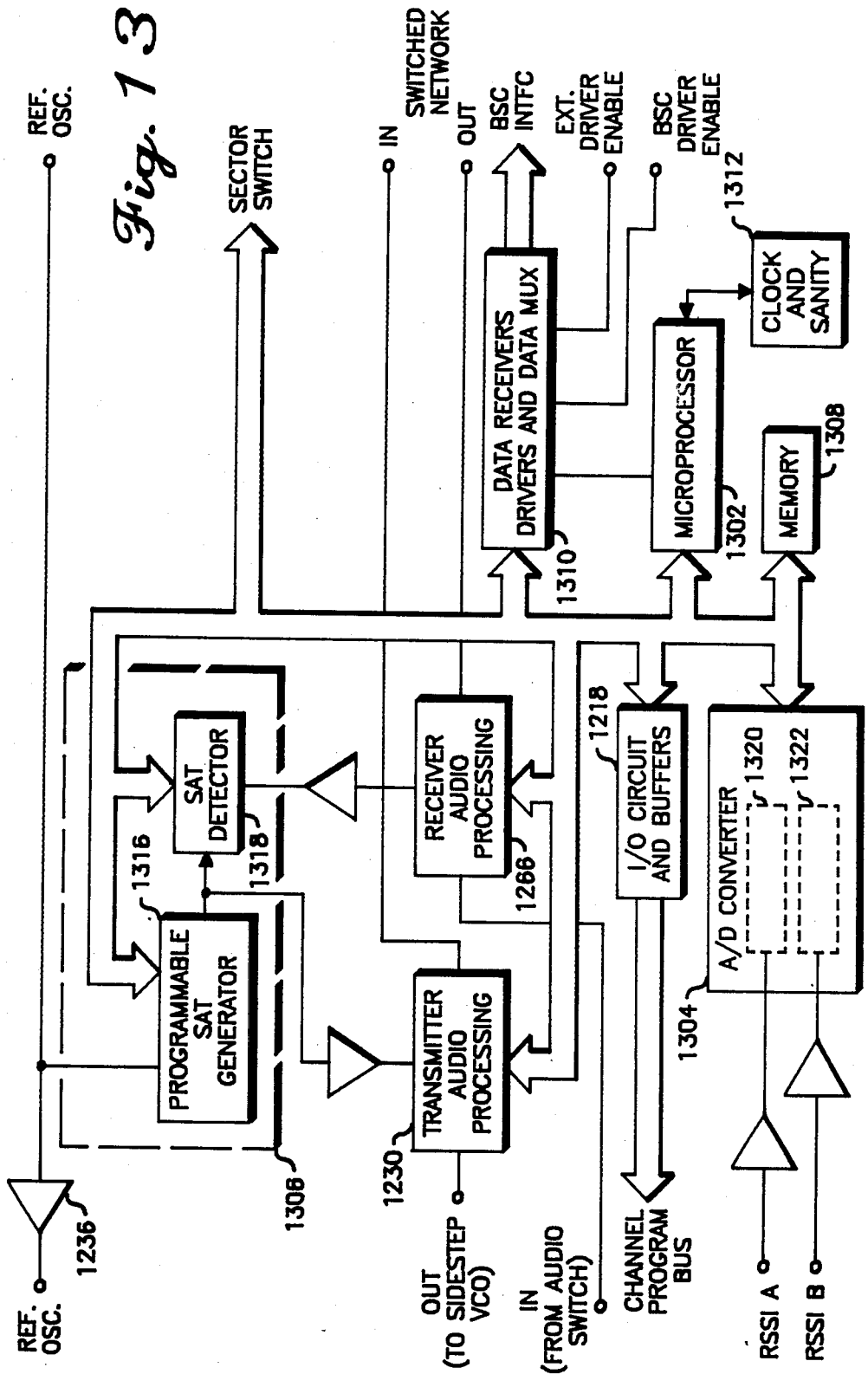
FIG. 13 is a block diagram of the microcomputer which may be employed in the transceiver of FIG. 12.

Referring to FIG. 13, it will be seen that the microcomputer 1118 and 1120 of the transceivers may consist of a microprocessor 1302 (which may be an MC1468705G2 microprocessor available from Motorola, Inc. or equivalent) which is used to control the other submodules of the transceiver. The microcomputer 1118 has as major peripherals an A/D converter 1304, a supervisory audio tone (SAT) generator 1306, conventional RAM and ROM memory 1308, conventional data receivers, drivers and data mux (for selecting sources and destinations of land/radio data) 1310, and microprocessor clock and sanity timing device 1312. Control data and information is coupled between the microprocessor 1302 and the base site controller (BSC) via the data receivers/drivers 1310 which may have additional enable ports for external control. The analog to digital (A/D) converter 1304 for the received signal strength may be realized by a multiplexing A/D converter such as an MC145041 available from Motorola, Inc. or equivalent. Conceptually, a dual channel A/D converter 1304 can be considered individual A/D channel 1320 for receiver (branch A) and A/D channel 1322 for receiver (branch B). The digitized received signal strength is made available to microprocessor 1302 is needed.

The supervisory audio tone (SAT) detector 1306 is realized in the preferred embodiment by generating a selected SAT frequency in a programmable SAT generator 1316 (which may conventionally be realized using a phase locked loop such as an MC14046 available from Motorola Inc. and standard programmable BCD/binary counters such as MC14569 available from Motorola, Inc.). The SAT output may then be coupled to a SAT detector circuit 1318 which may be a conventional frequency comparison network. The detection may then be coupled to the microprocessor 1302.

Because the transceiver of the preferred embodiment is equipped with a programmable frequency synthesizer 1202 for both receiver and transmitter (programmed by microprocessor 1302 via I/O circuit and buffers 1218), an A/D converter 1304, and a SAT generator 1306, the transceiver may be used interchangeably as a scan receiver, as a voice channel transceiver, or a signalling channel receiver. This fact allows the BSC 1108 to be relieved of the task of making and controlling the process of signal strength measurement and SAT detection thereby making possible the use of available voice channel transceivers as scanning receivers when a handoff measurement request is received from the control terminal 420. The transceiver takes cell site characteristics that are downloaded from the voice channel controlled of BSC 1108 via the transceiver interface communications link. The downloaded information is the cell type in which the transceiver is being operated (Omni, Sector) and what kind of function the transceiver is to perform in the system: voice channel transceiver, scanning receiver, or signalling transceiver. Also, the transceiver used for scanning is capable of queueing several handoff measurement requests, executing them, and queueing the results.

Handoff measurement requests that come to a transceiver via the VCC are queued automatically and are run as soon as possible. The only reason that a handoff measurement request would not run immediately is that it would have to wait for a current request to finish execution. Included within the handoff measurement request are the channel frequency synthesizer 1202 programming and the SAT generator 1316 programming.

When a handoff measurement request comes to a selected transceiver, a flag is set that alerts the SSI measurement software to the fact that there is a measurement request that is waiting execution in the queue. When the measurement request software task runs, it pulls the request out of the queue, programs the SAT generator 1316, programs the frequency synthesizer 1202, and then begins taking measurements.

Results of the handoff measurement requests are queued in the RAM memory 1308 of the transceiver microcomputer and await an opportunity to be sent uplink to the VCC. That opportunity comes when the VCC polls the transceiver for its status. Since handoff measurement responses have priority over all other outbound messages from the transceiver, the response will go uplink as soon as possible.

Figure 14:
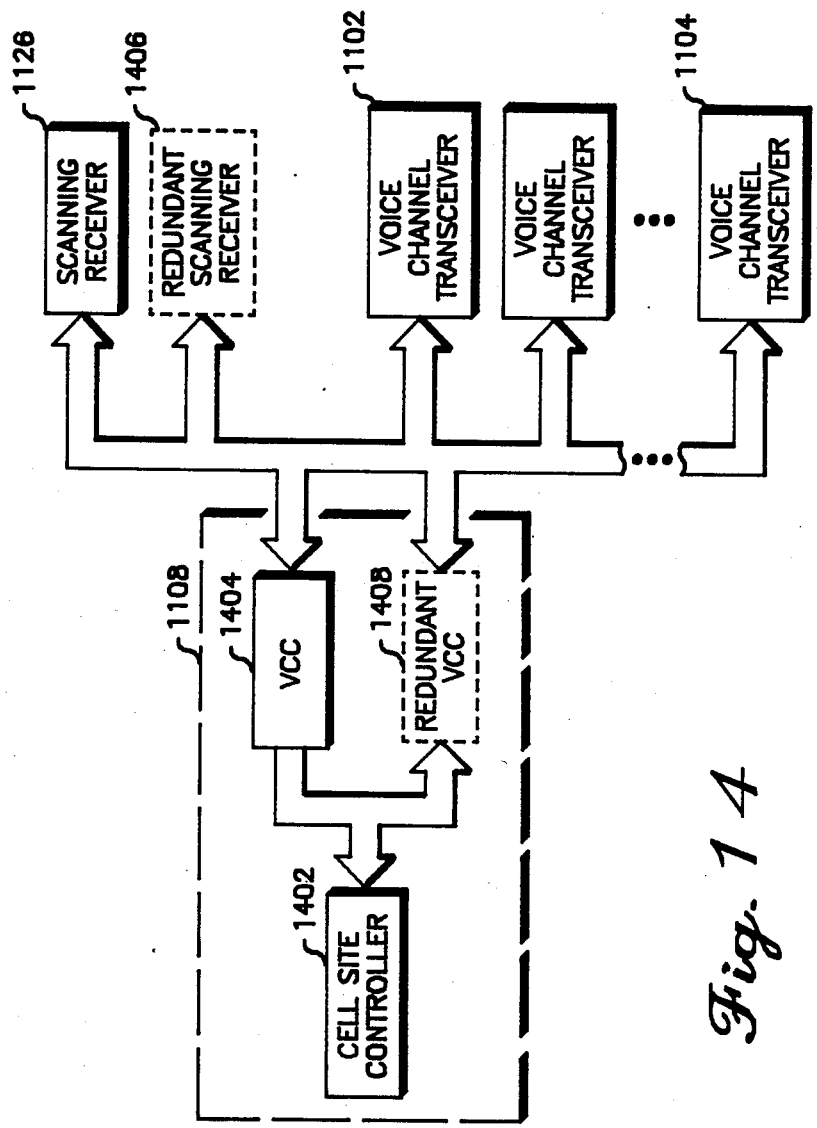
FIG. 14 is a block diagram of the base site controller of the present invention illustrating redundancy.

FIG. 14 illustrates the basic block diagram of the BSC 1108 and its interconnection to the transceivers. The cell site controller (CSC) 1402 is the highest level function and cordinates all of the activities at the cell site as well as providing the interface between the cell site and the telephone central office 422 (mediated by the control terminal 420).

Figure 15:
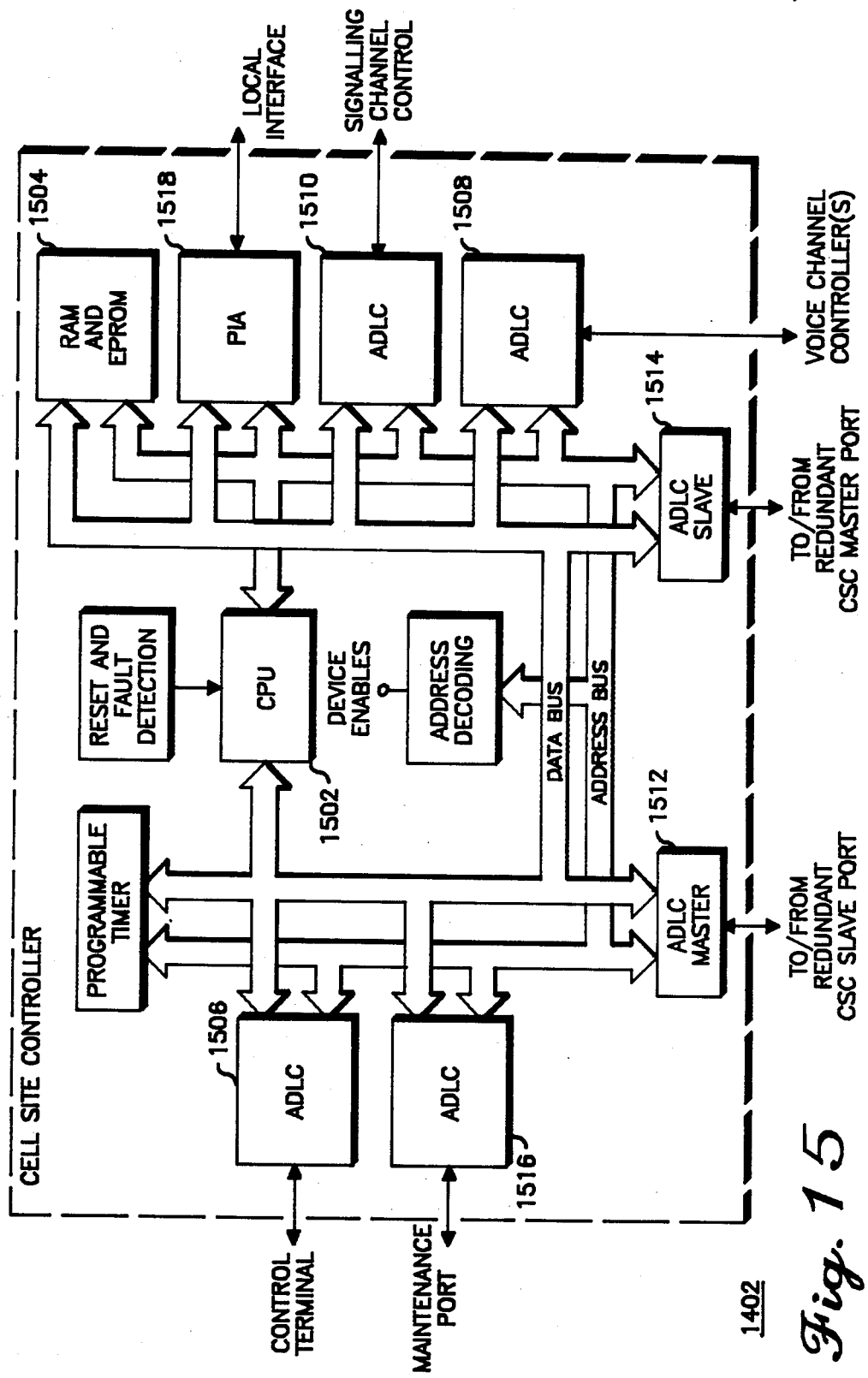
FIG. 15 is a detailed block diagram of a cell site controller (CSC) such as that which may be employed in the base site controller of FIG. 14.

A more detailed block diagram of the cell site controller (CSC) is shown in FIG. 15. A microprocessor such as an MC6802 available from Motorola, Inc., is employed as a central processing unit (CPU) 1502 which coordinates all of the activities at the cell site in accordance with an operating program stored in RAM and EPROM 1504. Six data ports are used to exchange control and status messages with the control terminal 420 (via ADLC 1506), one or more voice channel controllers (VCC's) (via ADLC 1508), signalling channel receiver control (via ADLC 1510), redundant (slave) CSC and/or redundant (master) CSC (via ADLC 1512 and 1514 respectively), and a maintenance port (via ACIA 1516). All of the aforementioned serial ports in the preferred embodiment, except for the maintenance port, are bit-oriented synchronous serial data links using a version of the Advanced Data Communications Control Procedures (ADCCP) as the communications protocol. The maintenance port, used for maintenance and software loading, supports a standard asynchronous serial protocol. Additionally, a peripheral interface adapter (PIA 1518) supports auxiliary input/output which may be used as a local customer interface.

A voice channel controller (VCC) 1404 may control up to 30 voice transceivers and one scanning receiver in the preferred emboidment. A redundant VCC 1408 may be employed to provide system redundancy down to the voice channel transceiver and double the transceiver capacity. This is possible because each transceiver has two communications ports with which to communicate with two VCCs. The communications ports on the transceivers are embodied within the transceiver microcomputer itself. A signal called "XCVREN" (transceiver enable) is used by the VCC to select the port on the transceiver that will be used for communications. One VCC will control one port and a redundant "partner" VCC will control the other port. The transceiver communicates with that VCC which is currently asserting the XCVREN signal. Thus it is possible for the second VCC to continue controlling a voice transceiver should the first VCC fail. It is even possible to reconstruct call activity as the call processing and maintenance state of the voice transceiver is continuously being updated.

If the maintenance state of the channel is "in service", the call processing state can be taken from the transceiver and reconstruct the call. The call processing and maintenance states of a particular channel are stored within the transceiver by sending these states periodically in certain messages that are used to control the transceiver by the controlling VCC. When another VCC (the partner) takes control of the channel, it queries the transceiver as to its call and maintenance states. The maintenance sate is used to update a list and the call state is used to reconstruct the SAT detection algorithm in the VCC. From the call state it can be determined whether to be looking for positive or negative SAT detection on the channel. This corresponds to the channel being in a conversation state, a connect state, or a disconnect state.

Figure 16:
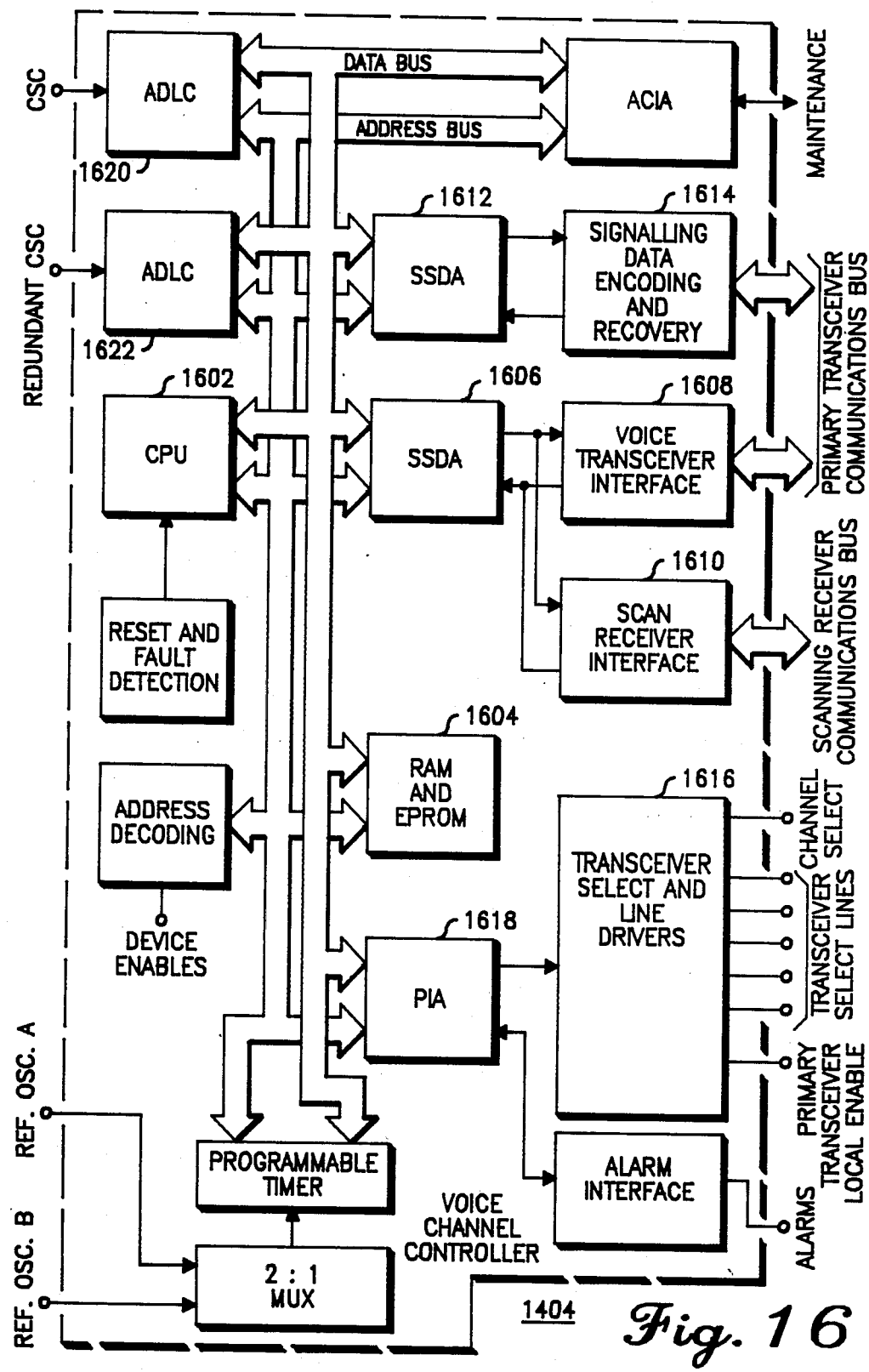
FIG. 16 is a detailed block diagram of a voice channel controller (VCC) such as that which may be employed in the base site controller of FIG. 14.

A detailed block diagram of a voice channel controller (such as VCC 1404) which may be employed in the present invention is shown in FIG. 16. The central processing unit (CPU 1602) may be a microprocessor such as an MC6809 available from Motorola, Inc. This CPU 1602 is used to control the cell site voice channel transceivers and scanning receiver(s) in accordance with programmed steps stored in RAM and EPROM 1604. In a nonredundant configuration of the present invention, VCC 1404 may control up to 30 channels of radio equipment and one scanning receiver employing SSDA 1606, voice channel transceiver interface 1608, and scanning receiver interface 1610. Signalling data encoding and decoding is controlled via SSDA 1612 and signalling encoding and recovery interface 1614. Transceivers are selected by select logic and line driver circuit 1616 which is controlled by CPU 1602 via peripheral interface adaptors (PIA 1618). In the redundant configuration requiring two VCC's, each transceiver (being dual-ported) can communicate with both VCCs. Under normal operating conditions, each VCC actively controls half of the channels while exchanging control and status messages with the other half. Interface with the master CSC (if present) via ADLC 1622.

The signal strength detector and indicator of the present invention uniquely employs the two branch diversity receivers and the integral microcomputer of the aforementioned transceiver in a manner which enables the efficient use of radio equipment at a cellular fixed equipment site. This signal strength detector and indicator has previously been briefly discussed as the signal strength processing block 1270 of FIG. 12. and the microcomputer system of FIG. 13. A similar method of signal strength measurement is discussed in U.S. Pat. No. 4,485,486—Webb et al., assigned to the assignee of the present invention.

Figure 17:
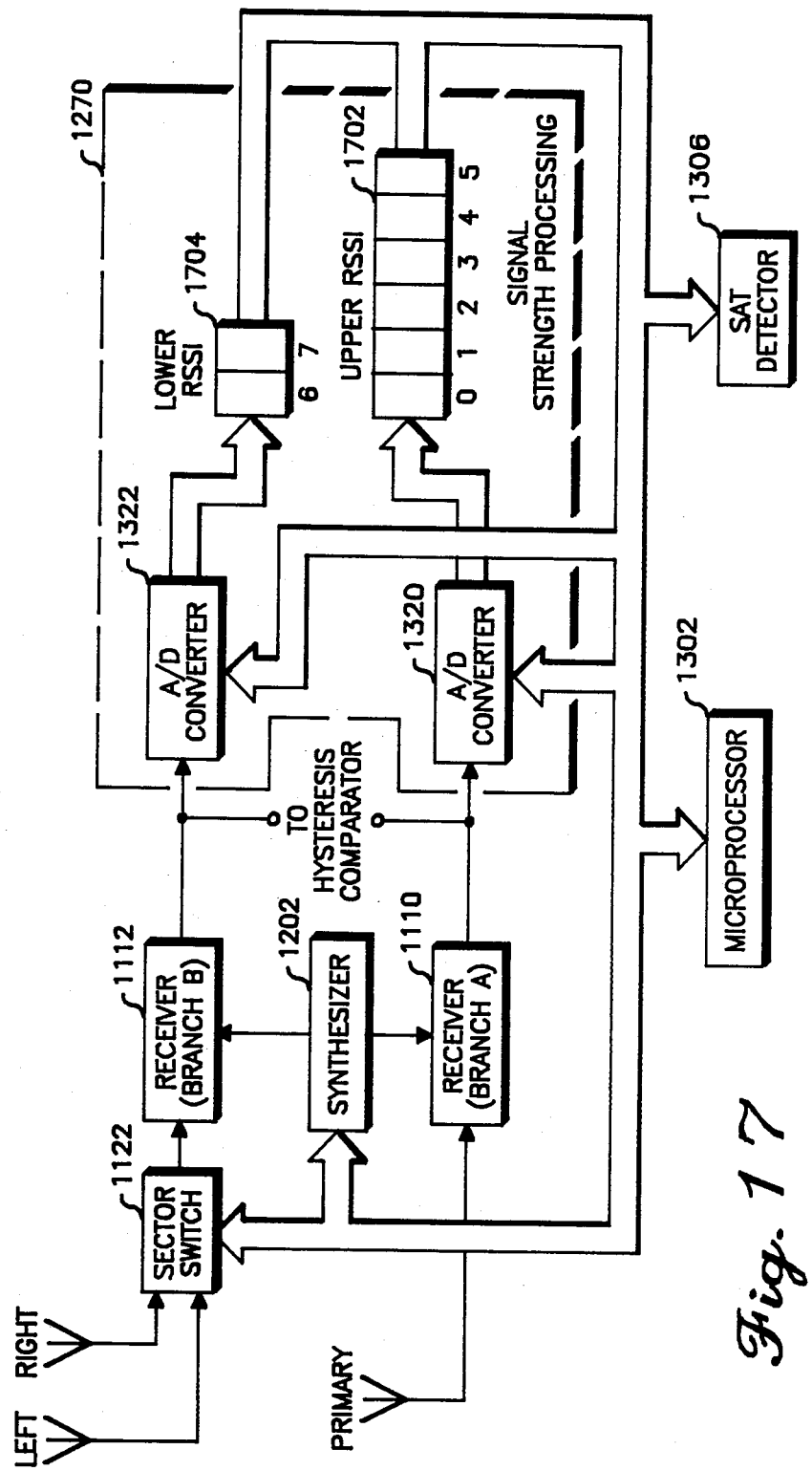
FIG. 17 is a block diagram of the signal strength detector for a sector voice channel receiver employing the present invention.

Regrouping the functions previously described into a functional block diagram illustrating the received signal indicator (PSSI) system employed by the present invention, the block diagram of FIG. 17 results. This configuration in a cellular system is useful when a voice channel receiver is required to perform a signal strength measurement in the primary sector and its left and right adjacent sectors. The primary antenna is coupled to the receiver (branch A) 1110 which produces, inter alia, an analog signal representative of the signal strength of the radio frequency signal received by the primary (sector) antenna. This analog signal is digitized into one of 256 digital levels by A/D converter 1320 and output as an 8-bit word to a memory location designated bin 0, upper RSSI. (Each sample of the A/D converter is stored in one of eight predetermined eight bit memory locations of RAM memory 1308 which are designated here bins 0 through 7. For ease of understanding, the eight bins are mentally partitioned into six bins (0 through 5) labeled upper RSSI 1702 and two bins (6 and 7) labeled lower RSSI 1704. Although the preferred embodiment employs computer mediated storage of RSSI samples, the invention need not be so limited as other methods of storage and manipulation may be employed without deviating from the scope of the invention). At each pulse output from clock 1312, the A/D converter 1320 output is sequentially stored in the next bin.

The radio frequency signal received by the left and right adjacent sectors is coupled to receiver (branch B) 1112 via sector switch 1122. The sector switch 1122 is toggled between the left and right antenna in synchronism with the clock 1312 so that the left and right antennas are alternately coupled to the receiver (branch B) 1112. The analog signal strength output of receiver (branch B) 1112 is coupled to A/D converter 1322 for digitization into one of 256 levels in a manner identical to that employed by A/D converter 1320. The output of A/D converter 1322 is subsequently coupled as an 8-bit word to bins 6 or 7 of lower RSSI 1704. The digital representation of the signal strength received by the right adjacent sector antenna is then stored in bin 6 of lower RSSI 1702 and the digital representation of the left adjacent sector antenna is stored in bin 7 of lower RSSI 1704. Bins 6 and 7 may be filled repetitively as the upper RSSI 1702 is being filled, or they may be filled once during the filling of the six bins of upper RSSI 1702, or a process of signal strength selection may be employed without deviating from the scope of the present invention. The output of both upper RSSI 1702 and lower RSSI 1704 may be read by microprocessor 1302 at the time when all of the six bins of upper RSSI 1702 have been filled with a signal strength value. The process of microprocessor 1302 interpretation of the signal strength processing circuit 1270 will be described later.

A receiver which would make particularly beneficial use of this process is one which would be part of a voice channel transceiver. Uniquely, each voice transceiver would be able, in the present invention, to determine the signal strength of a remote unit being served by this transceiver (and the signal strength in the adjacent sectors) without requiring a special scan by another scanning receiver.

Figure 18:
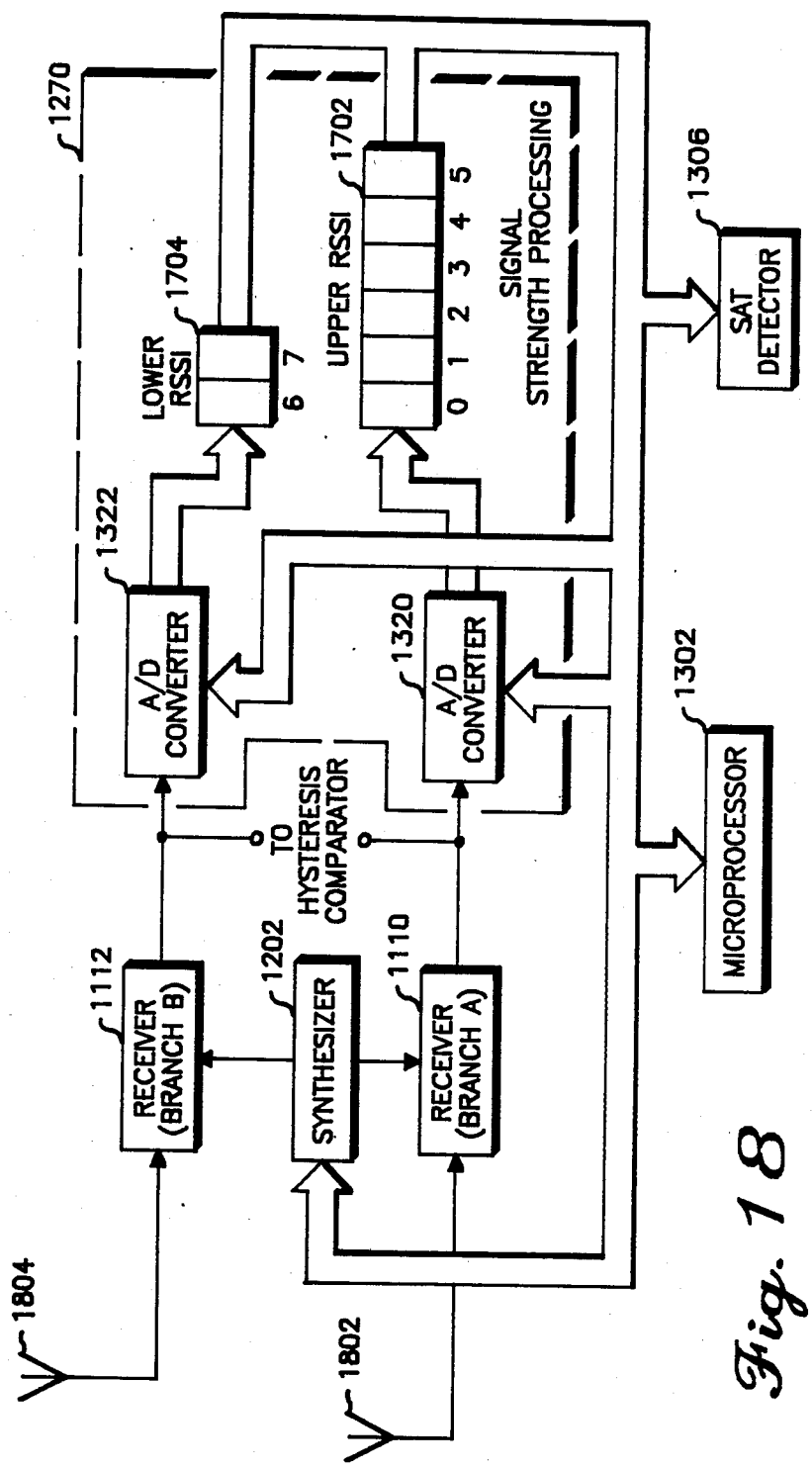
FIG. 18 is a block diagram of the signal strength detector for a diversity omnidirectional receiver employing the present invention.

An alternative to the sectorized signal strength described in FIG. 17 is an omnidirectional signal measurement with diversity antennas such as that illustrated in FIG. 18. A primary antenna 1802 is coupled to receiver (branch A) 1110 and the analog signal strength output is digitized by A/D converter 1320 and stored in the six bins of upper RSSI 1702 as described previously. Similarly, a secondary diversity antenna 1804 is coupled to receiver (branch B) 1112 and an analog signal strength output is coupled to A/D converter 1322 and stored in bins 6 and 7 of lower RSSI 1704. At the end of the bin filling cycle of upper RSSI 1702, the microprocessor may read the output of the bin storage locations and process the signal strength information.

Figure 19:
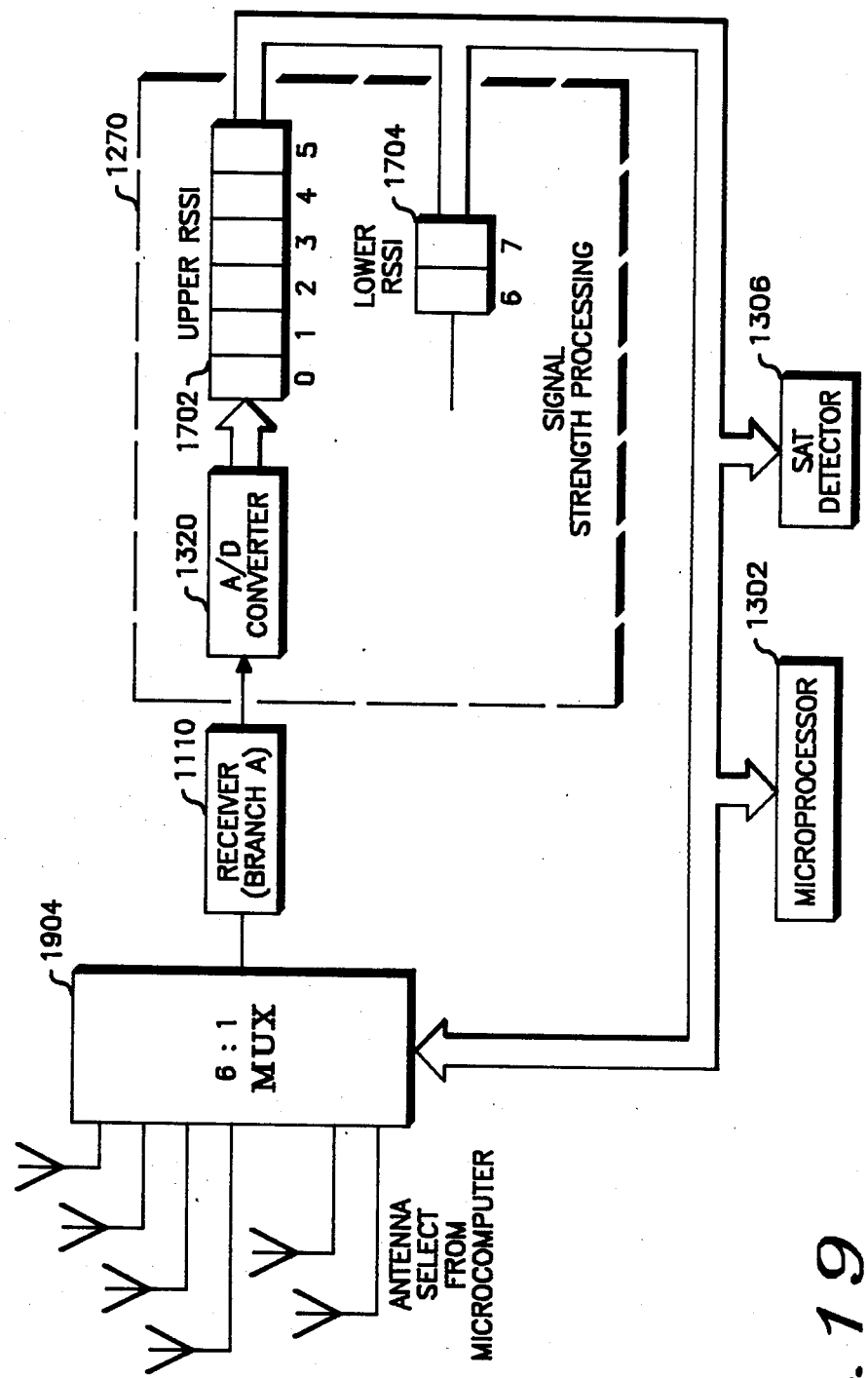
FIG. 19 is a block diagram of the signal strength detector for a six sector receiver employing the present invention.

A third alternative may employ the signal strength measurement of the present invention to measure six sector antennas as shown in FIG. 19. Each of the six antennas may be sequentially coupled to receiver (branch A) 1110 by a 6:1 multiplexor 1904. This multiplexor 1904 may be a conventional arrangement of PIN diodes or other switching elements which may be addressed by the microprocessor 1302. In the preferred embodiment of the present invention, three address lines are coupled to multiplexor 1904 and switch antennas coupled to receiver (branch A) 1110 in synchronism with clock 13120. As described for previous alternatives, the signal strength output is digitized by A/D converter 1320 and coupled to upper RSSI 1702. The output from each particular antenna is stored in a predetermined bin so that it is possible for the microprocessor 1302 to correlate stored signal strength information to a particular antenna. The stored information may be read by microprocessor 1302 and processed as described later.

The supervisory audio tone (SAT) detector 1306 compares the received SAT signal to a locally generated tone of a frequency determined by command of the microprocessor 1302 and control terminal 420, as described previously. If a match in SAT frequency is found, the SAT detector 1306 provides a detect output on the microprocessor 1302 bus which may be utilized as part of a signal strength measurement report.

Figure 20A:
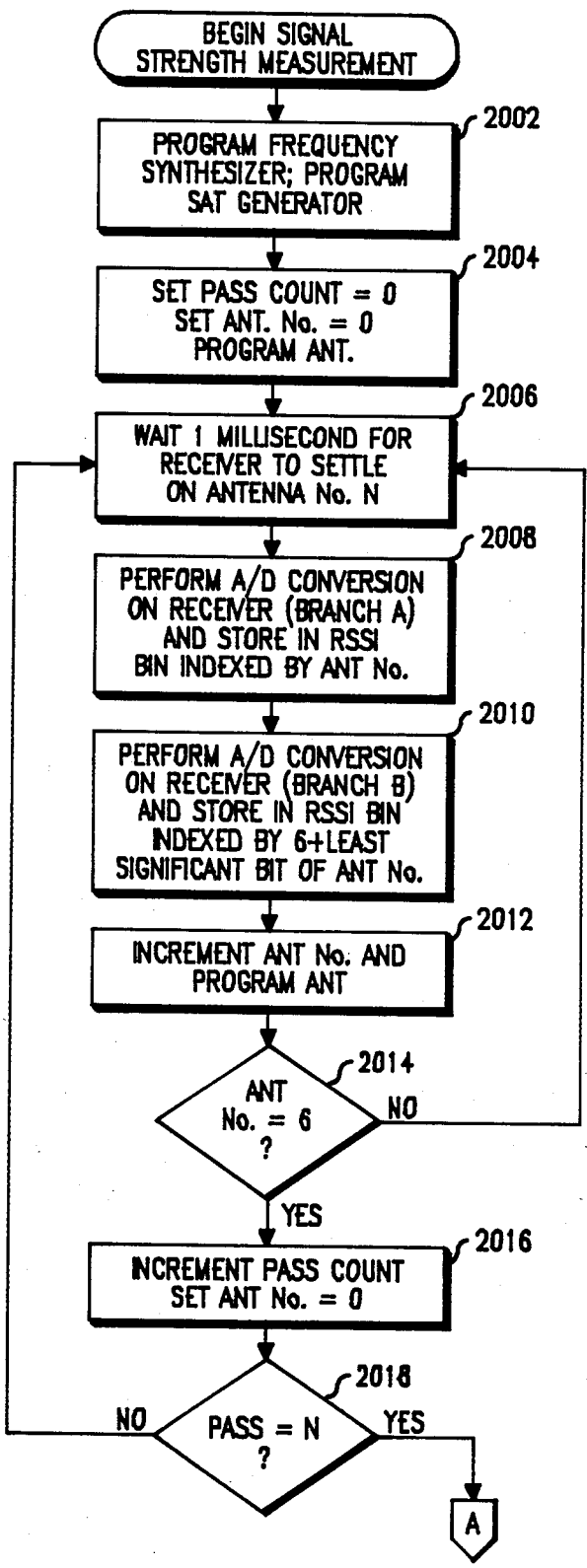
FIGS. 20a and 20b are flowcharts of the signal strength measurement process employed in the present invention.
Figure 20B:
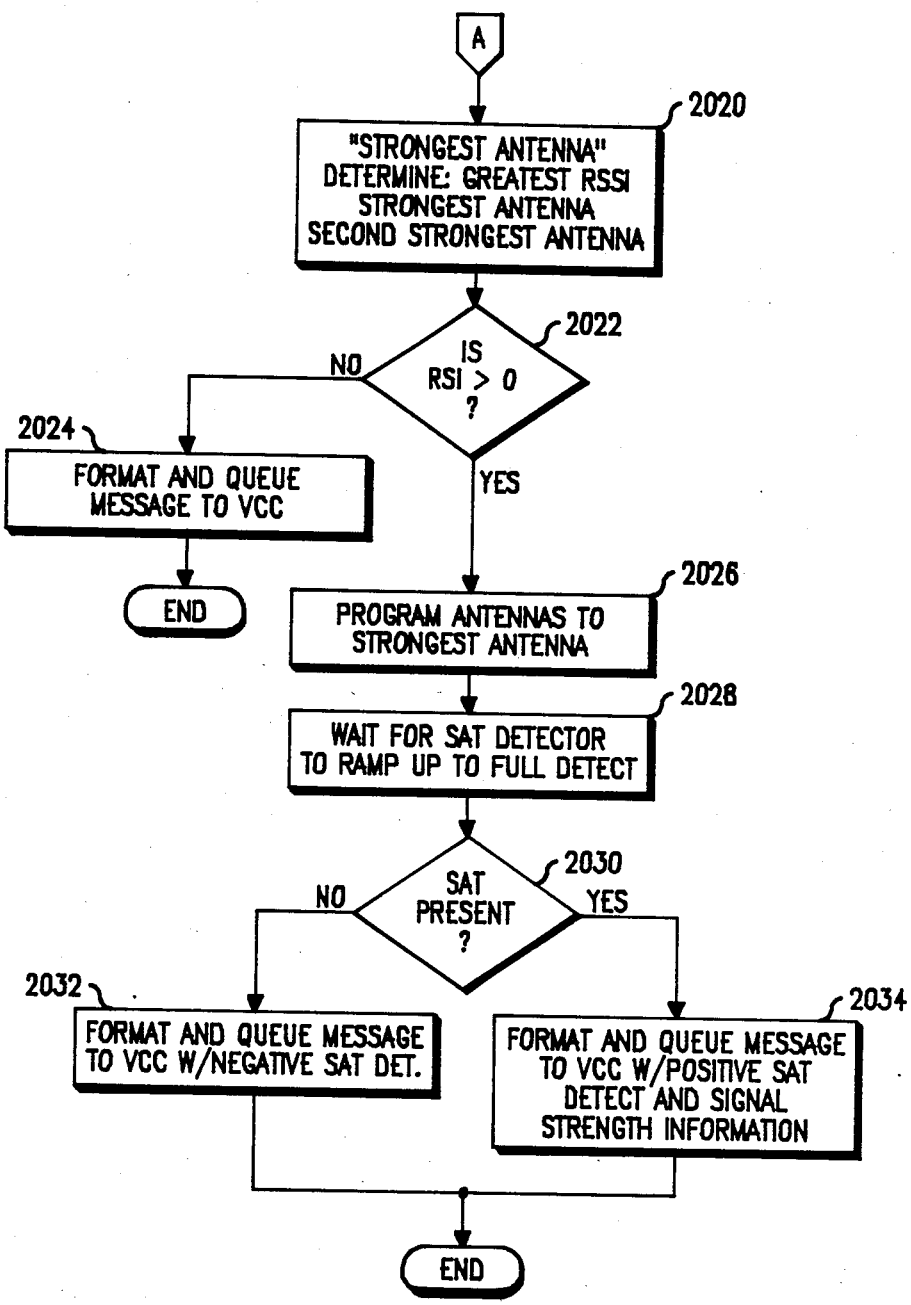

Referring now to FIGS. 20a and 20b, the process by which a signal strength measurement is made is shown in flowchart form. The frequency synthesizer 1202 of the receiver system is programmed with the channel upon which the signal strength measurement is to be made and the SAT detector 1306 is programmed with the proper SAT frequency at step 2002. The pass count and starting antenna number are initialized at 2004. The process waits for a predetermined period of time (1 millisecond in the preferred embodiment) at 2006 for the receiver to settle before making an A/D conversion of the signal strength output from receiver (branch A) 1110 and storing the result in the upper RSSI bin indexed by the antenna number, at 2008. A similar measurement is made on the signal strength output from receiver (branch B) 1112 and stored in the lower RSSI bin indexed by the sum of 6 and the least significant bit of the antenna number, at 2010. The antenna number is then incremented and the multiplexer 1904 is incremented (if used) at 2012.

If the antenna number is not equal to six, as determined at 2014, the A/D conversion and storage is repeated for the next antenna. If the antenna number is equal to six (indicating that six antenna samples have been taken), the pass count is incremented and the antenna number is reset to zero at 2016. The number of passes is determined at step 2018 and the process is repeated if the pass number does not equal "N". "N" is determined by the system design and whether the receiver is a voice channel transceiver making a signal strength measurement on its assigned voice channel or whether the receiver is a voice channel transceiver assigned as a scanning receiver to a scan event. If the system has capacity for determining whether the stored signal strength in a particular bin is less than the currently measured strength, a plurality of passes enables the signal strength measurement to remove signal strength fluctuations caused by Rayleigh fading and provide a more reliable measurement of signal strength. In the preferred embodiment, "N" equals four for a voice channel receiver and two (for time considerations) in a scanning receiver.

If the pass determination equals "N", a subroutine 2020 determines which antenna bin contains the strongest and second strongest signal strength. A determination that the measured signal strength is greater than zero is made at 2022. (If the signal strength is zero, a message so indicating is sent to the voice channel controller at 2024). To ensure that the proper remote unit is being measured, the SAT frequency is measured from the strongest antenna by setting the receiver system to the antenna having the strongest measured signal (at 2026). The process then waits a period of time at 2028 for the SAT detector 1306 to settle (which may be 60 milliseconds in the preferred embodiment) before determining whether a SAT frequency match has occurred (at 2030). If a mismatch has occurred, the voice channel controller is notified at 2032; if a match has occurred, a message is sent to the voice channel controller at 2034 that the SAT is correct and providing the signal strength information.

Figure 21:
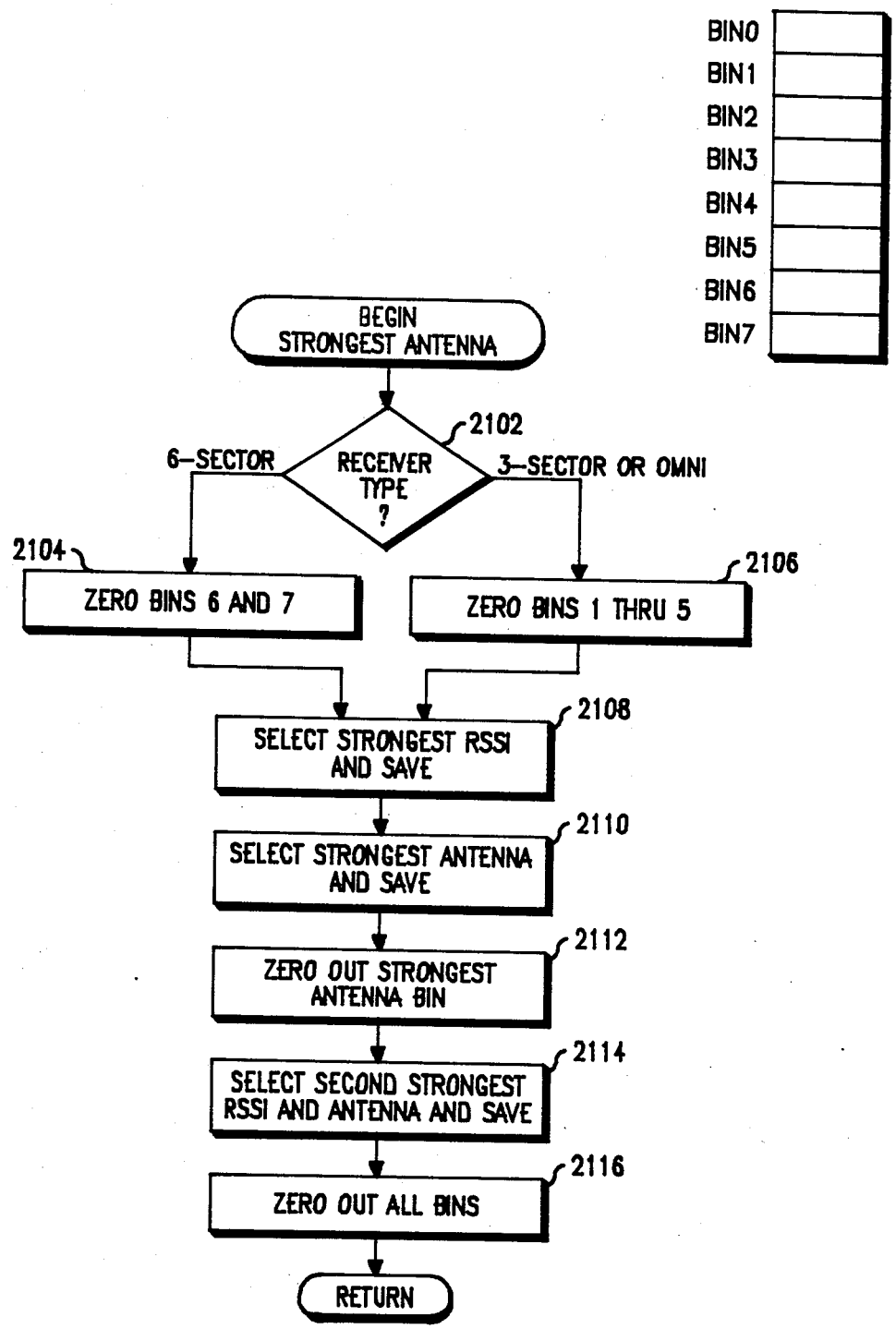
FIG. 21 is a flowchart of the strongest and second strongest signal and antenna selection process employed in the present invention.

The strongest and second strongest antenna signal is determined by the process of FIG. 21. A determination of whether the receiver is a three sector receiver (such as that of FIG. 17), an omnidirectional diversity receiver (FIG. 18), or a six sector receiver (FIG. 19) is made at 2102. If the receiver is a six sector receiver the contents of lower RSSI bins 6 and 7 are set to zero at 2104 (since they contain no useful information in this system configuration). If the receiver is a three sector or an omnidirectional receiver, the upper RSSI bins 1 through 5 are set to zero at 2106 since the information redundant with the contents of bin 0. The contents of each bin are compared by conventional comparison techniques to determine the bin having the strongest signal strength at 2108. The representation of the antenna receiving the strongest signal is also saved at 2110 and the corresponding bin is set to zero at 2112. The bin having the second strongest signal strength and the corresponding antenna representation is determined at 2114 before all bins are zeroed out at 2116. Thus this process produces a record of the value of the strongest and second strongest received signal strengths and a record of which antennas received the strongest and second strongest signals. This information may be used by the voice channel transceiver to determine when the received signal strength may be weak enough to request a handoff from the CSC or central controller or the information may be queued and transmitted to the VCC for use in reporting the results of a handoff measurement request.

In summary, then, the method and apparatus for measuring signal strength related to a particular sector antenna in a voice channel transceiver of a cellular radiotelephone system has been described. A novel voice channel transceiver may be employed as a temporary scanning receiver or as a signalling transceiver. In order that common equipment may be used for each function, a versatile signal strength measurement process capable of each type of cellular antenna configuration has been developed. Each transceiver has two receiver portions which may be coupled to two or more antennas. The signal strength received by each receiver portion is output in analog form to analog to digital converters which develop digital representations of the analog outputs. The digital representations are synchronously stored in memory location bins such that the contents of each bin may be correlated with the antenna which was used to receive the signal. The content of the bins may be read after all the antennas have been sampled by the receivers to determine the magnitude of the strongest and second strongest signal and the antennas which received the strongest and second strongest signals. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A method for determining which of three sector antennas of a multisectored cell in a cellular radiotelephone system receives the strongest radio frequency (RF) signal, comprising the steps of:
   (a) rectifying a RF signal induced in a primary sector antenna coupled to a diversity input of a first voice channel receiver branch to produce an analog signal related to the magnitude of said induced RF signal and converting said analog signal into a plurality of digital signal representations thereof;
   (b) storing said digital signal reprsentations in a plurality of storage locations;
   (c) sequentially sampling RF signals induced in first and second sector antennas which are switchably coupled to a diversity input of a second voice channel receiver branch each said first and second sector antenna having a geographic coverage area adjacent to a geographic coverage area of said primary antenna;

(d) rectifying each sequentially sampled RF energy signal to produce sequential analog signals related to the strength of each said sequentially sampled RF signal and converting each said sequential analog signal into a corresponding sequential digital signal representation;

(e) cyclically storing each said sequential digital representation in first and second storage locations associated with said first and second sector antenna;

(f) reading at least one of said plurality of storage locations and both said first and second storage locations; and (g) determining which stored digital representation represents the RF signal with the greatest magnitude and identifying which antenna received the RF signal with the greatest magnitude.

2. A method in accordance with the method of claim 1 further comprising the step of storing, in response to said determining step, a digital representation equal to zero signal strength in the storage location having the digital representation of the RF signal with the greatest magnitude.

3. A method in accordance with the method of claim 2 further comprising the steps of reading at least one of said plurality of storage locations and both said first and second storage locations for the digital representation of the RF signal with the second greatest magnitude and identifying the antenna receiving said RF signal with the second greatest magnitude.

4. A method in accordance with the method of claim 1 further comprising the step of determining which of a plurality of supervisory audio tones modulates the RF signal having the greatest magnitude.

5. A method in accordance with the method of claim 1 further comprising the step of repeating steps (a) through (f) a predetermined number of times before determining which stored digital representation represents the RF signal with the greatest magnitude.

6. A method in accordance with the method of claim 5 further comprising the step of selecting the digital representation of the stronger of the digital representation stored during the last repeat and the digital representation of the current repeat for storage in said storage locations for each of the sector antennas.

7. Fixed site equipment for determining which of three sector antennas of a multisectored cell in a cellular radiotelephone system receives the strongest radio frequency (RF) signal, comprising:

means in a first voice channel receiver branch having a diversity input coupled to a primary sector antenna for rectifying a RF signal induced in said primary sector antenna to produce an analog signal related to the magnitude of said induced RF signal and for converting said analog signal into a plurality of digital signal representations thereof;

means for storing said digital signal representations in a plurality of storage locations;

means in a second voice channel receiver branch having a diversity input switchably coupled to first and second sector antennas for sequentially sampling RF signals induced in first and second sector antennas having geographic coverage areas adjacent to a geographic coverage area of said primary antenna;

means for rectifying each sequentially sampled RF signal to produce sequential analog signals related to the strength of each said sequentially sampled RF signal and converting each said sequential analog signal into a corresponding sequential digital signal representation;

means for cyclically storing each said sequential digital representation in first and second storage locations associated with said first and second sector antenna;

means for reading at least one of said plurality of storage locations and both and said first and second stroage locations; and means for determining which stored digital representation represents the RF signal with the greatest magnitude and identifying which antenna received the RF signal with the greatest magnitude.

8. Fixed site equipment in accordance with claim 7 further comprising means for determining which of a plurality of supervisory audio tones modulates the RF signal having the greatest magnitude.

9. Fixed site equipment in accordance with claim 7 further comprising means responsive to said means for determining for storing a digital representation equal to zero signal strength in the storage location having the digital representation of the RF signal with the greatest magnitude.

10. Fixed site equipment in accordance with claim 9 further comprising means for reading at least one of said plurality of storage locations and both said first and second storage locations and for identifying the antenna receiving said RF signal with the second greatest magnitude.

* * * * *